(12) United States Patent
Qian et al.

(10) Patent No.: US 11,055,831 B2
(45) Date of Patent: Jul. 6, 2021

(54) METHODS AND SYSTEMS FOR FILLING LIGHT FOR VIDEO IMAGES

(71) Applicant: ZHEJIANG DAHUA TECHNOLOGY CO., LTD., Zhejiang (CN)

(72) Inventors: Yong Qian, Hangzhou (CN); Junjun Yu, Hangzhou (CN); Wei Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 28 days.

(21) Appl. No.: 16/448,068

(22) Filed: Jun. 21, 2019

(65) Prior Publication Data

US 2019/0311468 A1 Oct. 10, 2019

Related U.S. Application Data

(63) Continuation of application No. PCT/CN2017/115944, filed on Dec. 13, 2017.

(30) Foreign Application Priority Data

Dec. 21, 2016 (CN) .......................... 201611193829.3

(51) Int. Cl.
*G06T 5/00* (2006.01)
*H04N 5/232* (2006.01)
(Continued)

(52) U.S. Cl.
CPC .............. *G06T 5/009* (2013.01); *G06T 5/008* (2013.01); *G06T 5/50* (2013.01); *H04N 5/147* (2013.01);
(Continued)

(58) Field of Classification Search
CPC ........... G06T 5/009; G06T 5/008; G06T 5/50; G06T 2207/20012; G06T 2207/10016;
(Continued)

(56) References Cited

U.S. PATENT DOCUMENTS

2007/0065036 A1 3/2007 Chen
2016/0260203 A1 9/2016 He et al.
(Continued)

FOREIGN PATENT DOCUMENTS

CN 101303766 A 11/2008
CN 101340523 A 1/2009
(Continued)

OTHER PUBLICATIONS

Boyadzhiev, Ivaylo, Sylvain Paris, and Kavita Bala. "User-assisted image compositing for photographic lighting." ACM Trans. Graph. 32.4 (2013): 36-1. (Year: 2013).*
(Continued)

*Primary Examiner* — Amandeep Saini
(74) *Attorney, Agent, or Firm* — Metis IP LLC

(57) ABSTRACT

A system and method for filling light for video images are provided. The method may include: obtaining, by at least one video processing device, a first image including a plurality of reference pixels and is associated with at least one brightness direction; for each of the plurality of reference pixels, obtaining, by the at least one video processing device, a reference brightness value; identifying, by the at least one video processing device, a target brightness direction from the at least one brightness direction; for each of the plurality of reference pixels, determining a brightness enhancement multiplier for the reference pixel based on the plurality of reference brightness values and locations of the plurality of reference pixels along the target brightness direction of the first image; and modifying, by the at least
(Continued)

one video processing device, brightness of the first image at least based on the brightness enhancement multipliers.

20 Claims, 8 Drawing Sheets

(51) Int. Cl.
*G06T 5/50* (2006.01)
*H04N 5/14* (2006.01)
*H04N 5/235* (2006.01)

(52) U.S. Cl.
CPC ..... *H04N 5/2351* (2013.01); *H04N 5/232945* (2018.08); *G06T 2207/10016* (2013.01); *G06T 2207/20012* (2013.01); *G06T 2207/20021* (2013.01)

(58) Field of Classification Search
CPC ........... G06T 2207/20021; G06T 2207/20172; H04N 5/232945; H04N 5/147; H04N 5/2351
USPC ........................................................ 382/274
See application file for complete search history.

(56) References Cited

U.S. PATENT DOCUMENTS

| | | |
|---|---|---|
| 2017/0032498 A1 | 2/2017 | Wang et al. |
| 2017/0091909 A1 | 3/2017 | Cao et al. |
| 2018/0005359 A1 | 1/2018 | Deng |

FOREIGN PATENT DOCUMENTS

| | | | |
|---|---|---|---|
| CN | 101345820 A | 1/2009 | |
| CN | 101727659 A | 6/2010 | |
| CN | 103093429 A | 5/2013 | |
| CN | 103841337 A | 6/2014 | |
| CN | 103974010 A | 8/2014 | |
| CN | 104182947 A | 12/2014 | |
| CN | 104517272 A | 4/2015 | |
| CN | 105574830 A | 5/2016 | |
| CN | 105827971 A | 8/2016 | |
| EP | 0708563 A2 * | 4/1996 | ........... H04N 19/543 |
| EP | 0708563 A2 | 4/1996 | |
| WO | 2018113567 A1 | 6/2018 | |

OTHER PUBLICATIONS

The Extended European Search Report in European Application No. 17883901.5 dated Nov. 20, 2019, 9 pages.

Ivaylo Boyadzhiev et al., User-assisted Image Compositing for Photographic Lighting, ACM Transactions on Graphics, 32(4), 2013, 11 pages.

International Search Report in PCT/CN2017/115944 dated Feb. 26, 2018, 4 pages.

Written Opinion in PCT/CN2017/115944 dated Feb. 26, 2018, 5 pages.

First Office Action in Chinese Application No. 201611193829.3 dated Mar. 27, 2019, 10 pages.

* cited by examiner

US 11,055,831 B2

METHODS AND SYSTEMS FOR FILLING LIGHT FOR VIDEO IMAGES

CROSS REFERENCE

This application is a continuation of International Application No. PCT/CN2017/115944, filed on Dec. 13, 2017, which claims priority to Chinese Application No. 201611193829.3, filed on Dec. 21, 2016. Each of the above-referenced applications is incorporated herein by reference in their entireties.

TECHNICAL FIELD

The present invention generally relates to a method and apparatus for video processing and more specifically to a method and apparatus for filling light for video images.

BACKGROUND

With continuous development of image processing technology, details in an image has become increasingly important. To better shown the details in the image, a fill light treatment may be performed on the image. Existing methods for filling light for the image mainly strengthen the center region of the image, while other regions, such as the top left corner of the image which may also be the region of interest for a user, may not be strengthened. Thus, there is a need for methods and systems to fill light for an image to better show details in the image.

SUMMARY

According to an aspect of the present disclosure, a system for processing images may comprise at least one video processing device, wherein during operation, the at least one video processing device may be configured to: obtain a first image including a plurality of reference pixels and is associated with at least one brightness direction; for each of the plurality of reference pixels, obtain a reference brightness value; identify a target brightness direction from the at least one brightness direction; for each of the plurality of reference pixels, determine a brightness enhancement multiplier for the reference pixel based on the plurality of reference brightness values and locations of the plurality of reference pixels along the target brightness direction of the first image; and modify, by the at least one video processing device, brightness of the first image at least based on the brightness enhancement multipliers.

In some embodiments, to obtain the plurality of reference brightness values, the at least one video processing device may be configured to: for each of the plurality of reference pixels, identify a plurality of pixels in a predetermined range corresponding to the reference pixel; for each of the plurality of pixels, obtain a brightness value corresponding to the pixel; and determine the reference brightness value of the reference pixel based on the obtained brightness values.

In some embodiments, to identify the target brightness direction, the at least one video processing device may be configured to: determine the target brightness direction from the at least one brightness direction based on the plurality of reference brightness values and locations of the plurality of reference pixels along the at least one brightness direction.

In some embodiments, to identify the target brightness direction, the at least one video processing device may be configured to: for each of the plurality of reference pixels, determine a binary value based on the plurality of reference brightness values; and for each of the at least one brightness direction, determine a value based on the plurality of binary values and the locations of the plurality of reference pixels along the brightness direction.

In some embodiments, after the determining of the values, the at least one video processing device is further configured to: determine a maximum value from the at least one value corresponding to the at least one brightness direction; and determine the brightness direction corresponding to the maximum value as the target brightness direction.

In some embodiments, for each brightness direction, to determine the value, the at least one video processing device may be configured to: for each of the plurality of reference pixels, assign a weight for the reference pixel based on the location of the reference pixel along the brightness direction; and determine the value based on the plurality of binary values and the weights of the plurality of reference pixels.

In some embodiments, to determine the value, the at least one video processing device may be configured to: determine the value as a sum of the products of the weight of each reference pixel and the binary value of that reference pixel.

In some embodiments, to determine the binary value of each reference pixel, the at least one video processing device may be configured to: rank the plurality of reference brightness values to determine a median value or average value; and for each of the plurality of reference pixels, upon determining that the reference brightness value of the reference pixel is no less than the median value, determine the binary value to be a first value; or upon determining that the reference brightness of the reference pixel is less than the median value, determine the binary value to be a second value different from the first value.

In some embodiments, the plurality of reference pixels may include a first reference pixel with a maximum reference brightness value, a second reference pixel with a minimum reference brightness value, and a third reference pixel with a third brightness value, and the at least one video processing device may be configured to: determine a brightness enhancement multiplier for the third pixel based on the maximum reference brightness value, the minimum reference brightness value, the third brightness value, a distance between the first reference pixel and the second reference pixel along the target brightness direction, and a distance between the first reference pixel and the third reference pixel along the target brightness direction; and modify, by the at least one video processing device, brightness of the first image at least based on the determined brightness enhancement multiplier for the third pixel.

In some embodiments, the first image further may include a plurality of target pixels corresponding to the plurality of reference pixels, and the at least one video processing device may be configured to: for each of the plurality of target pixels determine a brightness enhancement multiplier for the target pixel based on the brightness enhancement multipliers for the corresponding reference pixels; and modify brightness of the target pixel based on the determined brightness enhancement multiplier for the target pixel.

In some embodiments, the plurality of reference pixels may define a rectangular region, and the plurality of target pixels is within the rectangular region.

In some embodiments, the first image further may include a plurality of target pixels corresponding the plurality of reference pixels, and the at least one video processing device may be configured to: obtain a scene change indicator; and for each of the plurality of target pixels, determine a brightness enhancement multiplier for the target pixel at least based on the scene change indicator; and modify brightness of the target pixel based on the brightness enhancement multiplier.

In some embodiments, the scene change indicator may indicate that a scene change has occurred, and the images further includes a second image including the plurality of target pixels, and for each of the plurality of target pixels in the first image, to determine the brightness enhancement multiplier for the target pixel, the at least one video processing device may be configured to: determine the brightness enhancement multiplier for the target pixel in the first image to be the same as a brightness enhancement multiplier for the target pixel in the second image.

In some embodiments, the at least one video processing device may be further configured to: obtain a scene change indicator; and update the scene change indicator at least based on target brightness direction.

According to another aspect of the present disclosure, a method for processing images may comprise: obtaining, by at least one video processing device, a first image including a plurality of reference pixels and is associated with at least one brightness direction; for each of the plurality of reference pixels, obtaining, by the at least one video processing device, a reference brightness value; identifying, by the at least one video processing device, a target brightness direction from the at least one brightness direction; for each of the plurality of reference pixels, determining a brightness enhancement multiplier for the reference pixel based on the plurality of reference brightness values and locations of the plurality of reference pixels along the target brightness direction of the first image; and modifying, by the at least one video processing device, brightness of the first image at least based on the brightness enhancement multipliers.

In some embodiments, the obtaining of the plurality of reference brightness values may include: for each of the plurality of reference pixels, identify a plurality of pixels in a predetermined range corresponding to the reference pixel, for each of the plurality of pixels, obtain a brightness value corresponding to the pixel; and determining the reference brightness value of the reference pixel based on the obtained brightness values.

In some embodiments, the identifying of the target brightness direction may include: determining the target brightness direction from the at least one brightness direction based on the plurality of reference brightness values and locations of the plurality of reference pixels along the at least one brightness direction.

In some embodiments, the identifying of the target brightness direction may include: for each of the plurality of reference pixels, determining a binary value based on the plurality of reference brightness values; and for each of the at least one brightness direction, determining a value based on the plurality of binary values and the locations of the plurality of reference pixels along the brightness direction.

In some embodiments, the method may further include, after the determining of the values: determining a maximum value from the at least one value corresponding to the at least one brightness direction; and determining the brightness direction corresponding to the maximum value as the target brightness direction.

In some embodiments, for each brightness direction, the determining of the value may include: for each of the plurality of reference pixels, assigning a weight for the reference pixel based on the location of the reference pixel along the brightness direction; and determining the value based on the plurality of binary values and the weights of the plurality of reference pixels.

In some embodiments, the determining of the value includes: determining the value as a sum of the products of the weight of each reference pixel and the binary value of that reference pixel.

In some embodiments, the determining of the binary value of each reference pixel may include: ranking the plurality of reference brightness values to determine a median value or average value; and for each of the plurality of reference pixels, upon determining that the reference brightness value of the reference pixel is no less than the median value, determining the binary value to be a first value; or upon determining that the reference brightness of the reference pixel is less than the median value, determining the binary value to be a second value different from the first value.

In some embodiments, the plurality of reference pixels includes a first reference pixel with a maximum reference brightness value, a second reference pixel with a minimum reference brightness value, and a third reference pixel with a third brightness value, and the method may include: determining a brightness enhancement multiplier for the third pixel based on the maximum reference brightness value, the minimum reference brightness value, the third brightness value, a distance between the first reference pixel and the second reference pixel along the target brightness direction, and a distance between the first reference pixel and the third reference pixel along the target brightness direction; and modifying, by the at least one video processing device, brightness of the first image at least based on the determined brightness enhancement multiplier for the third pixel.

In some embodiments, the first image further includes a plurality of target pixels corresponding to the plurality of reference pixels, and the method may further include: for each of the plurality of target pixels determining a brightness enhancement multiplier for the target pixel based on the brightness enhancement multipliers for the corresponding reference pixels; and modifying brightness of the target pixel based on the determined brightness enhancement multiplier for the target pixel.

In some embodiments, the first image further includes a plurality of target pixels corresponding the plurality of reference pixels, and the method further includes: obtaining a scene change indicator; and for each of the plurality of target pixels, determining a brightness enhancement multiplier for the target pixel at least based on the scene change indicator; and modifying brightness of the target pixel based on the brightness enhancement multiplier.

In some embodiments, the scene change indicator indicates that a scene change has occurred, and the images may further include a second image including the plurality of target pixels, and for each of the plurality of target pixels in the first image, the determining of the brightness enhancement multiplier for the target pixel includes: determining the brightness enhancement multiplier for the target pixel in the first image to be the same as a brightness enhancement multiplier for the target pixel in the second image.

In some embodiments, the method may further include: obtaining a scene change indicator; and updating the scene change indicator at least based on target brightness direction.

In another aspect of the present disclosure, a non-transitory computer readable medium may store instructions which when executed by a processor, causing the processor to execute operations comprising: obtaining, by at least one video processing device, a first image including a plurality of reference pixels and is associated with at least one brightness direction; for each of the plurality of reference pixels, obtaining, by the at least one video processing device, a reference brightness value; identifying, by the at least one video processing device, a target brightness direction from the at least one brightness direction; and for each of the plurality of reference pixels, determining a brightness enhancement multiplier for the reference pixel based on the plurality of reference brightness values and locations of the plurality of reference pixels along the target brightness direction of the first image; and modifying, by the at least one video processing device, brightness of the first image at least based on the brightness enhancement multipliers.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
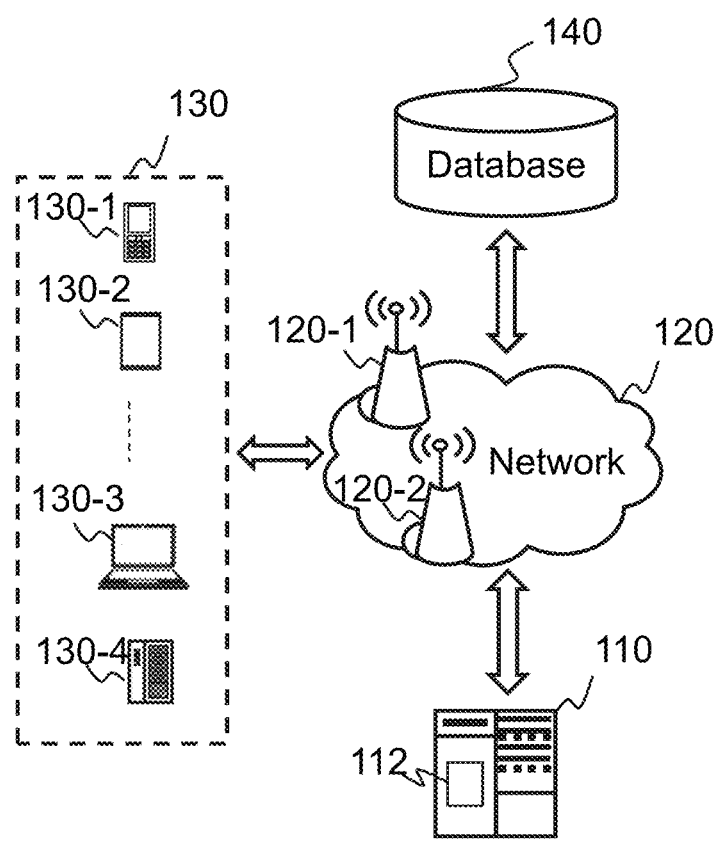
FIG. 1 is a block diagram of an exemplary video processing system according to some embodiments of the present disclosure.

The present disclosure is directed to a system and method for processing video frames based on a transmission performance of a network for video transmission. The transmission performance of the network may be used to determine a frame discarding manner and/or a frame encoding manner. The content of the video frames may also be taken into consideration during the encoding of the video. The size of the encoded video may be greatly reduced as a result.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

It will be understood that the term "frame" is used to describe an image unit, but the term also applies to other similar terminology such as image, field, picture, or sub-units or regions of an image, frame etc. The terms pixels and blocks or groups of pixels may be used interchangeably where appropriate. In the specification, the term image means a whole image or a region of an image, except where apparent from the context. Similarly, a region of an image can mean the whole image. An image includes a frame or a field, and relates to a still image or an image in a sequence of images such as a film or video, or in a related group of images.

The image may be a grayscale or color image, or another type of multi-spectral image, for example, IR, UV or other electromagnetic image, or an acoustic image etc.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

An aspect of the present disclosure relates to processing of brightness of images, such as image frames in a video stream. For example, an aspect of the present disclosure is to find an ideal direction as reference to modify brightness of pixels in an image. For example, to fill light (e.g., modify or adjust the brightness) for a certain pixel of the frame, a brightness enhancement multiplier for the pixel in the frame may be determined based on the brightness values of the plurality of pixels, and locations of the plurality of pixels along a certain direction of the frame. Given that a pixel with lower brightness value may have a farther distance to the pixel with maximum brightness value along a certain direction, with the above method of determining the brightness enhancement multiplier, pixel with a farther distance to the pixel with maximum brightness value may correspond to a larger brightness enhancement multiplier. Thus, details in darker regions of the image may be adjusted to be clearer.

FIG. 1 is a block diagram of an exemplary video processing system 100 according to some embodiments of the present disclosure.

The video processing system 100 may be a single electronic device including an image acquisition unit (e.g., a camera) and image processing unit (e.g., a CPU and/or GPU to process images of video streams and/or a transitory and/or non-transitory storage medium to store video processing instructions for the CPU and/or GPU and store the processed and/or unprocessed video streams etc.).

Additionally or alternatively, the video processing system 100 may also include a plurality of electronic devices electronically or wirelessly connected with each other. For example, the video processing system 100 may include a server 110, a network 120, a terminal 130, and a database 140. The server 110 may include a processing engine 112. Merely for the purpose of illustration, in the present disclosure uses the system structure as shown in FIG. 1 as an example of the video processing system. One of ordinary skill in the art at the time of filing of this disclosure would understood that the system structure of single electronic device is equally well-known among the ordinary skilled person in the art.

The server 110 may be configured to process a video stream. The video stream may include a plurality of frames of images in a frame sequence (e.g., a sequence of video image frames). For example, the video stream may include a current frame (or referred to as a first frame or first image) and a historical frame (or referred to as a second frame). The current frame may refer to a frame to be processed. For example, the current frame may refer to a frame on which a fill light treatment (e.g., modification and/or adjustment of brightness to pixels of the current frame to achieve a visual effect to the current frame of image, as if adding additional light to the scene in the current frame of image.) may be performed. The historical frame may refer to a frame which is before the current frame in the frame sequence. For example, the historical frame may include a last frame.

A frame (e.g., the current frame) may include a plurality of reference pixels and a plurality of target pixels. As used herein, a target pixel may refer to pixel, a parameter of which is to be determined. A reference pixel may refer to pixel with reference information to determine a parameter associated with the target pixel. Exemplary reference information may include a reference brightness value of the reference pixel, location of the reference pixel along a certain brightness direction (e.g., a target brightness direction), etc. As used herein, a reference brightness value of a reference pixel may be determined based on a brightness values corresponding to a plurality of pixels which lie in a certain range corresponding to the reference pixel. For example, a reference brightness value of a reference pixel may be determined by averaging the brightness values corresponding to the plurality of pixels. Exemplary parameter of the target pixel may include a brightness enhancement multiplier. A target pixel may correspond to a plurality of reference pixels, based on reference information of which a parameter of the target pixel may be determined. For example, the target pixel may lie in a region (e.g., a rectangular region) defined by the plurality of reference pixels, and the brightness enhancement multiplier for the target pixel may be determined based on reference information of the reference pixels. Detailed description of the determination of the brightness enhancement multiplier found elsewhere in the present disclosure.

A frame (e.g., the current frame) may be of at least one brightness direction. As used herein, a brightness direction (or referred to as a direction) may refer to a direction along which pixels with brightness values or reference brightness values are located. A brightness direction may include top-down direction, left-right direction, or an inclined direction, or the like, or any combination thereof. The at least one brightness direction may include a target brightness direction (or referred to as a target direction), which may refer to a direction along which the locations of the reference pixels may be used to determine a brightness enhancement multiplier for each of the reference pixels. The determination or identification of the target brightness direction may be illustrated elsewhere in the present disclosure. In some embodiments, brightness of the frame may be modified based on the determined brightness enhancement multipliers.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the terminal 130 and/or the database 140 via the network 120. As another example, the server 110 may be directly connected to the terminal 130 and/or the database 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process a current frame as described in the present disclosure.

The processing engine 112 may determine (or identify) a target brightness direction of the current frame (or referred to as a target brightness direction). As illustrated before, the current frame may include at least one brightness direction. The processing engine 112 may determine (or identify) the target brightness direction from the at least one brightness direction. For example, the current frame may be of one brightness direction, and the processing engine 112 may determine the one brightness direction to be the target brightness direction of the current frame. As another example, the current frame may include a plurality of brightness direction, and the processing engine 112 may determine (or identify) the target brightness direction from the plurality of brightness directions.

To determine (or identify) the target brightness direction of the current frame, the processing engine 112 may construct at least one binary image (a first binary image, a second binary image) corresponding to the current frame, and determine a target brightness direction of the at least one binary image. The target brightness direction of the current frame may correspond to and/or be the same as the target brightness direction of binary image. As used herein, a binary image may refer to an image that has only two possible values (or referred to as binary values) for each pixel. The processing engine 112 may construct a binary image corresponding to the current frame by assigning a binary value to each of the reference pixels in the current frame. For example, the processing engine 112 may assign first binary values (or second binary values) to reference pixels to construct a first binary image (or a second binary image).

The processing engine 112 may assign a first binary value of a reference pixel based on the reference brightness values of the plurality of reference pixels. For example, the processing engine 112 may rank the plurality of reference brightness values to determine a median value of the plurality of reference brightness values. For each of the plurality of reference pixels, the processing engine 112 may determine whether the reference brightness value of the reference pixel is no less than the median value. Upon determining that the reference brightness value of the reference pixel is no less than the median value, the processing engine 112 may determine the first binary value reference pixel to be a first value (e.g., 1). Upon determining that the reference brightness of the reference pixel is less than the median value, the processing engine 112 may determine the first binary value of the reference pixel to be a second value (e.g., 0) different from the first value. The processing engine 112 may determine a second binary value of a reference pixel based on a predetermined brightness value (e.g., predetermined by the video processing system 100). For example, for each reference pixel, the processing engine 112 may determine whether the reference brightness value of the reference pixel is no less than a predetermined brightness value. Upon determining that the reference brightness value of the reference pixel is no less than the predetermined brightness value, the processing engine 112 may determine the first binary value reference pixel to be the first value (e.g., 1). Upon determining that the reference brightness value of the reference pixel is no less than the predetermined brightness value, the processing engine 112 may determine the first binary value of the reference pixel to be a second value (e.g., 0) different from the first value.

After the construction of the binary image (e.g., the first frame, and/or the second frame), the processing engine 112 may determine at least one statistical value of a binary image corresponding to at least one brightness directions of the binary image. As used herein, a statistical value of a binary image may refer to a value which statistically relates to the binary values and locations of the reference pixels in the binary image. A statistical value of the first binary image may be referred to as a first statistical value, and a statistical value of the second binary image may be referred to as a second statistical value. The processing engine 112 may determine a first statistical value (and/or a second statistical value) for each brightness direction based on the plurality of first binary values (and/or second binary values) and the locations of the plurality of reference pixels along the brightness direction of the current frame.

The processing engine 112 may determine the target brightness direction based on the determined statistical values (e.g., the first statistical values or the second statistical values). For example, the processing engine 112 may determine the maximum one of the first statistical values (or referred to as a maximum first statistical value) from the at least one first statistical value corresponding to the at least one brightness direction, and determine the target brightness direction as the brightness direction corresponding to the maximum first statistical value.

After the determination of the target brightness direction, the processing engine may determine a brightness enhancement multiplier for each reference pixel based on the plurality of reference brightness values, and locations of the plurality of reference pixels along the target brightness direction of the current frame. Merely by way of example, the plurality of reference pixels may include a first reference pixel with a maximum reference brightness value, a second reference pixel with a minimum reference brightness value, and a third reference pixel. The processing engine 112 may determine a brightness enhancement multiplier (or referred to as a brightness enhancement multiplier) for the third pixel based on the maximum reference brightness value, the minimum reference brightness value, a reference brightness value of the third reference pixel (or referred to as a third brightness value), the distance between the first reference pixel and the second reference pixel along the target brightness direction, and the distance between the first reference pixel and the third reference pixel along the target brightness direction.

The processing engine 112 may determine a brightness enhancement multiplier for each target pixel (or referred to as a target brightness enhancement multiplier), and filling light for the target pixel based on the determined brightness enhancement multiplier. The processing engine 112 may determine the target brightness enhancement multiplier at least based on brightness enhancement multipliers for corresponding reference pixels, brightness enhancement multiplier for the corresponding target pixel in a historical frame, and/or a scene change indicator indicating whether a scene change has occurred. In some embodiments, the processing engine 112 may further determine a brightness enhancement multiplier for each target pixel in the current frame based on the brightness enhancement multipliers for the plurality of reference pixels corresponding to the target pixel. For example, the processing engine 112 may determine an average of the brightness enhancement multipliers for the plurality of reference pixels as the brightness enhancement multiplier for the target pixel. In some embodiments, the processing engine 112 may obtain a scene change indicator that indicates whether a scene change has occurred between the current frame and a historical frame (e.g., the last frame), and determine the target brightness enhancement multiplier at least based on the indicator and brightness enhancement multiplier for the corresponding target pixel in the historical frame. For example, when the indicator indicating that a scene change has occurred, for each target pixel, the processing engine 112 may determine the target brightness enhancement multiplier as the brightness enhancement multiplier for the corresponding target pixel in the historical frame.

In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the terminal 130 may include an image and/or video acquisition unit, such as a camera, a mobile device 130-1, a tablet computer 130-2, a laptop computer 130-3, and a built-in device 130-4 in a motor vehicle, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 130-4 may include an onboard computer, an onboard television, etc. Merely by way of example, the terminal 130 may include a controller (e.g., a remote-controller).

The network 120 may facilitate exchange of information and/or data. In some embodiments, one or more components in the video processing system 100 (e.g., the server 110, the terminal 130, and the database 140) may send and/or receive information and/or data to/from other component(s) in the video processing system 100 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the server 110 may include one or more network access points. For example, the server 110 may include wired or wireless network access points such as base stations and/or internet exchange points 120-1, 120-2, . . . , through which one or more components of the video processing system 100 may be connected to the network 120 to exchange data and/or information.

The database 140 may store data and/or instructions. In some embodiments, the database 140 may store data obtained/acquired from the terminal 130. In some embodiments, the database 140 may store data and/or instructions that the server 110 may execute or use to perform exemplary methods described in the present disclosure. In some embodiments, the database 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 140 may be connected to the network 120 to communicate with one or more components in the video processing system 100 (e.g., the server 110, the terminal 130). One or more components in the video processing system 100 may access the data or instructions stored in the database 140 via the network 120. In some embodiments, the database 140 may be directly connected to or communicate with one or more components in the video processing system 100 (e.g., the server 110, the terminal 130, etc.). In some embodiments, the database 140 may be part of the server 110.

Figure 2:
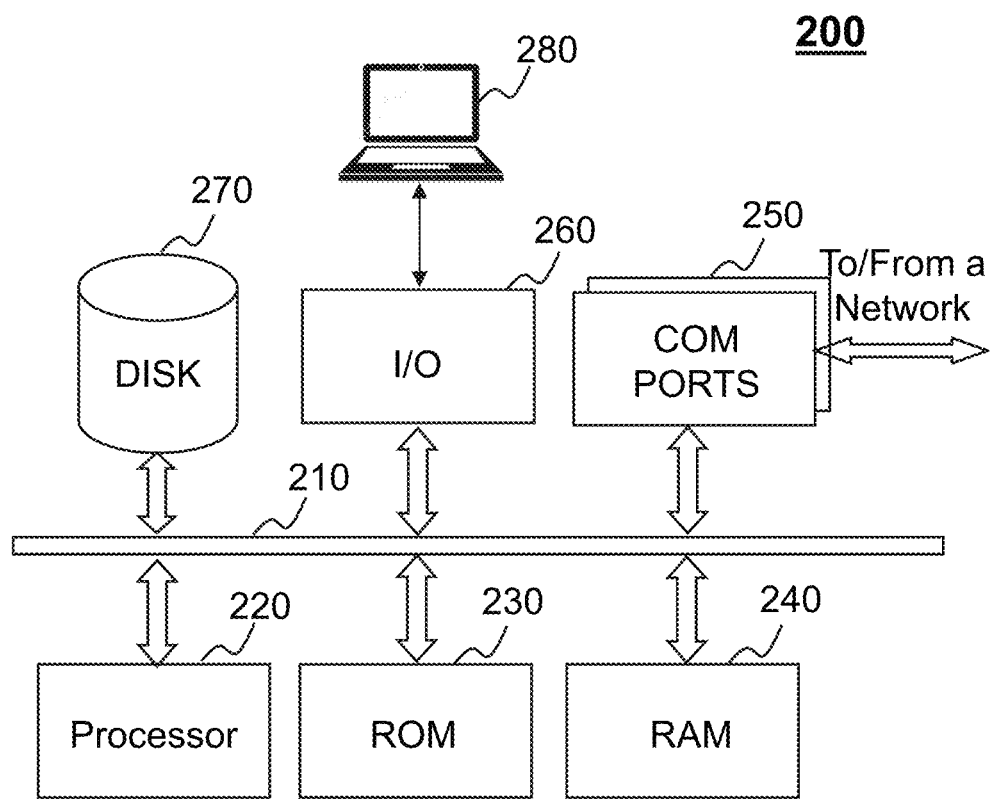
FIG. 2 is a schematic diagram illustrating exemplary hardware and software components of a computing device on which the server, the terminal, and/or database may be implemented according to some embodiments of the present disclosure.

FIG. 2 is a schematic diagram illustrating exemplary hardware and software components of a computing device 200 on which the server 110, the terminal 130, and/or database 140 may be implemented according to some embodiments of the present disclosure. For example, the processing engine 112 may be implemented on the computing device 200 and configured to perform functions of the processing engine 112 disclosed in the present disclosure.

The computing device 200 may be used to implement video processing system 100system for the present disclosure. In FIGS. 1-2, only one such computer device is shown purely for convenience purposes. One of ordinary skill in the art would understood at the time of filing of this application that the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processor 220, in the form of one or more processors, for executing program instructions. The exemplary computer platform may include an internal communication bus 210, a program storage and a data storage of different forms, for example, a disk 270, and a read only memory (ROM) 230, or a random-access memory (RAM) 240, for various data files to be processed and/or transmitted by the computer. The exemplary computer platform may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O port 260, supporting input/output between the computer and other components therein such as a user interface element 280. The computing device 200 may also receive programming and data via network communications.

Merely for illustration, only one processor 220 is described in the computing device 200. However, it should be note that the computing device 200 in the present disclosure may also include multiple processors, thus operations and/or method steps that are performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
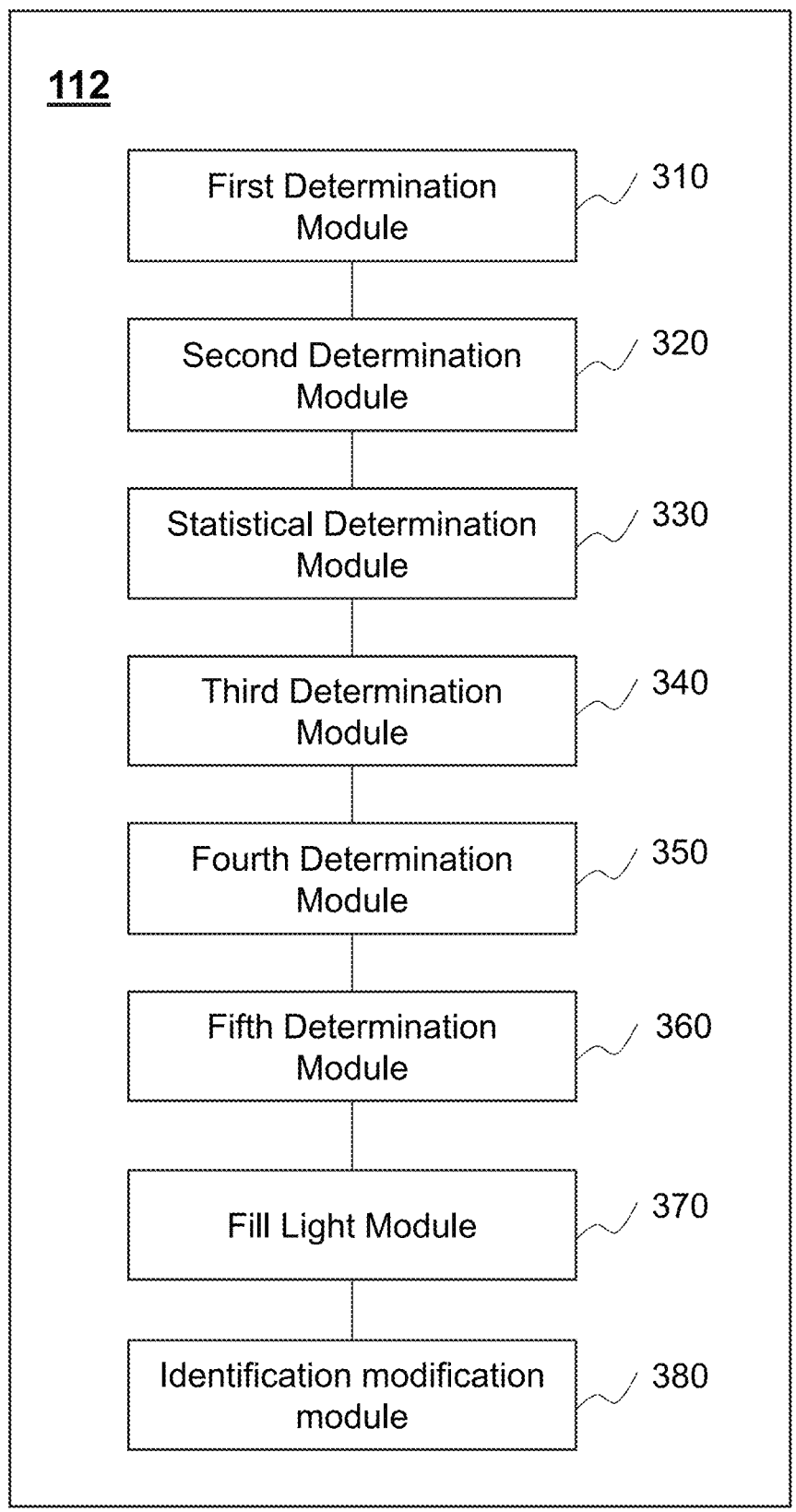
FIG. 3 is a schematic diagram illustrating an exemplary processing engine according to some embodiments of the present disclosure.

FIG. 3 is a schematic diagram illustrating an exemplary processing engine 112 according to some embodiments of the present disclosure. The processing engine 112 may include a first determination module 310, a second determination module 320, a statistical determination module 330, a third determination module 340, a fourth determination module 350, a fifth determination module 360, a fill light module 370, and an indicator modification module 380.

The first determination module 310 may divide, according to a predetermined rule, an image corresponding to a current frame into a plurality of rectangular regions. Each of the plurality of rectangular regions may inlcude a plurality of vertices which correspond to a plurality of coordinate points (or referred to as reference pixels). The first determination module 310 may determine an average brightness value of each of the coordinate points (or referred to as reference brightness value) based on ranges of the coordinate points. As used herein, the average brightness value of a coordinate point may refer to a mean value of the brightness value of each pixel within a certain range that correspond to the coordinate point. A charasteristic of the range (e.g., shape of the range, size of the range, location of the range, etc.) may be determined based on the coordiante point.

The second determination module 320 may determine a median or an average value of brightness values of the coordinate points, and determine a first binary image of the coordinate points based on the average brightness values of the coordinate points and the determined median of average brightness of the coordinate points.

The statistical determination module 330 may determine, for each of a plurality of brightness directions, for each of the coordinate points, a corresponding weight based on whether the coordinate point locates at the boundary corresponding to the direction. For each of the plurality of brightness directions, a statistical result of the first binary image (or referred to as the first statistical value) may be determined based on the brightness value and corresponding weight of each of the coordinate points in the first binary image.

The third determination module 340 may determine a target brightness direction corresponding to the image based on the statistical results of the first binary image corresponding to the brightness directions.

The fourth determination module 350 may determine, for each coordinate point, the brightness enhancement multiplier for the coordinate point (or referred to as brightness enhancement multiplier for the reference pixel) may be determined based on the distance between the coordinate point and the first coordinate point along the target brightness direction, the distance between the first coordinate point and the second coordinate point along the target brightness direction, and the brightness value of the coordinate point.

The fifth determination module 350 may determine, for each coordinate point, a brightness enhancement multiplier for each pixel in a rectangular region corresponding to the coordinate point, based on the brightness enhancement multiplier for the coordinate point.

The fill light module 370 may fill light for each pixel in the image based on the brightness enhancement multiplier for that pixel, and identification information indicating whether the current scene is changed.

As regards to the second determination module 320, in some embodiments, when the average brightness of a coordinate point is no less than the median value, the second determination module 320 may determine the coordinate point to correspond to 1 in the first binary image. When the average brightness of a coordinate point is less than the median value, the second determination module 320 may determine the coordinate point to correspond to 0 in the first binary image.

As regards to the statistical determination module 330, in some embodiments, for each of the brightness directions, the statistical determination module 330 may determine a boundary corresponding to the brightness direction in the first binary image. For each of the brightness directions, upon determining that a coordinate point in the first binary image locates at the boundary, the statistical determination module 330 may determine the coordinate point to correspond to a first weight. Upon determining that the coordinate point in the first binary image does not locate at the boundary, the statistical determination module 330 may determine the coordinate point to correspond to a second weight. The second weight may be different from the first weight.

In some embodiments, for a certain brightness direction, the statistical determination module 330 may determine an effective region in the first binary image. The effective region may refer to a region with a relatively high brightness at the boundary. The statistical determination module 330 may sum up the products of the weight of each coordinate point and the value of that coordinate point in the first binary image.

As regards to the third determination module 340, in some embodiments, for a first brightness direction, the third determination module 340 may determine whether the statistical result of the first binary image corresponding to the first brightness direction is greater than the predetermined first brightness threshold. Upon determining that the statistical result of the first binary image corresponding to the first brightness direction is larger than the predetermined first brightness threshold. The third determination module 340 may determine whether statistical result of the first binary image corresponding to the first brightness direction is the maximum one among the statistical results of first binary images corresponding to the brightness directions. The third determination module 340 may determine the first brightness direction as the target brightness direction, upon determining that the statistical result of the first binary image corresponding to the first brightness direction is the maximum one among the statistical results of first binary images corresponding to the brightness directions.

As regards to the second determination module 320, in some embodiments, the second determination module 320 may be configured to determine a second binary image of the coordinate points based on a pre-stored target average brightness value.

As regards to the statistical determination module 330, In some embodiments, for each of the brightness directions, the statistical determination module 330 may determine a weight of each of the coordinate points based on whether the coordinate point locates at the boundary corresponding to the brightness direction.

The statistical determination module 330 may further determine a statistical result of the second binary image (or referred to as a second statistical value) based on the brightness value and corresponding weight of each of the coordinate points in the second binary image.

In some embodiments, the statistical determination module 330 may determine, for the first brightness direction, whether the statistical result of the first binary image is greater than the predetermined first brightness threshold, and a statistical result of the second binary image is greater than a predetermined second brightness threshold. Upon the determination that the statistical result of the first binary image is greater than the predetermined first brightness threshold, and the statistical result of the second binary image is greater than a predetermined second brightness threshold, the statistical determination module 330 may determine whether the statistical result of the first binary image corresponding to the first brightness direction is the maximum one among the statistical results of first binary images corresponding to the brightness directions, and the statistical result of the second binary image corresponding to the first brightness direction is the maximum one among the statistical results of second binary images corresponding to the brightness directions. Upon the determination that the statistical result of the first binary image corresponding to the first brightness direction is the maximum one among the statistical results of first binary images corresponding to the brightness directions, and the statistical result of the second binary image corresponding to the first brightness direction is the maximum one among the statistical results of second binary images corresponding to the brightness directions, the statistical determination module 330 may determine the first brightness direction as the target brightness direction.

As regards to the fourth determination module 350, in some embodiments, the fourth determination module 350 may determine, for each coordinate point, a first brightness enhancement multiplier for the coordinate point and a second brightness enhancement multiplier for the coordinate point. The fourth determination module 350 may determine the first brightness enhancement multiplier and/or the second brightness enhancement multiplier for the coordinate point based on the fill light result, the fill light input value, the distance between the coordinate point and the first coordinate point in the target brightness direction, and the distance between the first coordinate point and the second coordinate point along the target brightness direction. For the determination of the first brightness enhancement multiplier, the fourth determination module 350 may determine a product of the average brightness of the coordinate point and a predetermined brightness enhancement multiplier as a fill light result, and determine the average brightness of the coordinate point as a fill light input value. For the determination of the second brightness enhancement multiplier, the fourth determination module 350 may determine the average brightness of the first coordinate point as the fill light result, and determine the average brightness of the coordinate point may as the fill light input value. For each coordinate point, the fourth determination module 350 may determine a ratio between the first brightness enhancement multiplier and the second brightness enhancement multiplier. The fourth determination module 350 may select a maximal ratio from the ratios, and determine whether the maximal ratio is greater than a predetermined ratio threshold. Upon determining that the maximal ratio is greater than the predetermined ratio threshold, the fourth determination module 350 may determine the brightness enhancement multiplier for each of the coordinate points as its corresponding ratio between the first brightness enhancement multiplier and the maximal ratio. Upon determining that the maximal ratio is no greater than the predetermined ratio threshold, the fourth determination module 350 may determine the brightness enhancement multiplier for each of the coordinate points as the first brightness enhancement multiplier thereof.

In some embodiments, the fifth determination module 360 may determine the brightness enhancement multiplier for each pixel in the image with a bilinear interpolation method. Specifically, the fifth determination module 360 may determine a brightness enhancement multiplier for a pixel within the rectangular region based on brightness enhancement multipliers for the four coordinate points corresponding to the rectangular region (e.g., the four vertices of the rectangular region) by employing a bilinear interpolation method.

As regards to the fill light module 370, in some embodiments, when the identification information of the scene change indicates that the scene changes, the fill light module 370 may fill light for each pixel in the current frame based on the brightness enhancement multiplier for each pixel in the last frame. When the identification information of the scene change indicates that the scene has not changed, the fill light module 370 may determine whether the brightness direction of the image (e.g., the current frame) is the same as the brightness direction of a historical frame. Upon determining that the brightness direction of the image is the same as the brightness direction of the historical frame, for each pixel, the fill light module 370 may calculate a ratio between a difference between the brightness enhancement multiplier for the pixel in the current frame and the brightness enhancement multiplier for the pixel in the last frame and the predetermined stepping threshold. The fill light module 370 may determine a target brightness enhancement multiplier corresponding to the pixel based on the ratio and the brightness enhancement multiplier for the pixel in the last frame. The fill light module 370 may fill light for the pixel in the current frame based on the target brightness enhancement multiplier. Upon determining that the brightness direction of the image is different from the brightness direction of the stored historical frame, the fill light module 370 may determine the target brightness enhancement multiplier corresponding to the pixel based on a fixed ratio threshold which is less than one, and the brightness enhancement multiplier for the pixel in the image corresponding to the last frame. The fill light module 370 may fill light for the pixel in the current frame based on the target brightness enhancement multiplier.

The device may further include the indicator modification module 380. The indicator modification module 380 may modify the identification information.

When the identification information of the scene change indicates that a scene change has occurred, the indicator modification module 380 may determine whether the brightness direction of the current frame is the same as the brightness direction of the last frame may be determined. Upon determining that the brightness direction of the current frame is different from the brightness direction of the last frame, the indicator modification module 380 may add the first direction change value by 1. Upon determining that the brightness direction of the current frame is the same as the brightness direction of the last frame, the indicator modification module 380 may set the first direction change value to zero. The indicator modification module 380 may determine whether the updated first direction change value is no less than a predetermined first direction change threshold. If so, the indicator modufication module 380 may modify the identification information of the scene change to indicate that a scene change has not occurred. When the identification information of the scene change indicates that a scene change has not occurred, the indicator modification module 380 may determine whether the brightness direction of the current frame is the same as the brightness direction of the last frame may be determined.

The indicator modification module 380 may update a second direction change value which may be stored in an electronic device, based on the determination result. Upon determining that the brightness direction of the current frame is different from that of the last frame, the indicator modification module 380 may add 1 to the second direction change value. Upon determining that the brightness direction of the current frame is the same as that of the last frame, the indicator modification module 380 may subtract 1 from the second direction change value. In some embodiments, the indicator modification module 380 may further determine whether the updated second direction change value is no less than a predetermined second direction change threshold. Upon determining that updated second direction change value is no less than the second direction change threshold, the indicator modification module 380 may set the scene change indicator to one.

In some embodiments, the indicator modification module 380 may determine whether the brightness direction of the current frame is the same as that of a historical frame which may be stored in an electronic device, may be determined. The indicator modification module 380 may update a third direction change value which may be stored in an electronic device, based on the determination result. Upon determining that the brightness direction of the current frame is different from that of the historical frame, the indicator modification module 380 may add 1 to the third direction change value. Upon determining that the brightness direction of the current frame is the same as that of the historical frame, the indicator modification module 380 may subtract 1 from the third direction change value. In some embodiments, the indicator modification module 380 may further determine whether the updated third direction change value is no less than a predetermined third direction change threshold. Upon determining that updated third direction change value is no less than a predetermined third direction change threshold, the indicator modification module 380 may modify the brightness direction of the historical frame to be the same as the brightness direction of the current frame.

The present disclosure may provide a method and device for filling light for a video image. The method may include one or more of the following operations. An image corresponding to a current frame may be divided into a plurality of rectangular regions according to a predetermined rule. An average brightness value of each of the coordinate points based on ranges of the coordinate points. A median of average brightness of the coordinate points may be determined. A first binary image of the coordinate points may be determined based on the average brightness values of the coordinate points and the determined median of average brigheneses of the coordinate points. For each of a plurality of brightness directions, for each of the coordiante points, a corresponding weight may be determined based on whether the coordinate point locates at the boundary corresponding to the direction. For each of the plurality of brightness directions, a statistical result of the first binary image may be determined based on the brightness value and corresponding weight of each of the coordinate points in the first binary image. A target brightness direction corresponding to the image may be determined based on the statistical results of the first binary image corresponding to the brightness directions. For each coordinate point, the brightness enhancement multiplier for the coordinate point may be determined based on the distance between the coordinate point and the first coordinate point along the target brightness direction, the distance between the first coordinate point and the second coordinate point along the target brightness direction, and the brightness value of the coordinate point. As used herein, the first coordinate point may refer to the coordinate point with a maximum brightness value among the coordinate points. The second coordinate point may refer to the coordinate point with a minimum brightness value among the coordinate points. For each coordinate point, a brightness enhancement multiplier for each pixel in a rectangular region corresponding to the coordinate point may be determined based on the brightness enhancement multiplier for the coordinate point. A fill light treatment may be performed on each pixel in the image based on the brightness enhancement multiplier for that pixel and identification information indicating whether the current scene is changed. In some embodiments, for each coordinate point, the brightness enhancement multiplier for the coordinate point may be determined based on the distance between the coordinate point and the first coordinate point along the target brightness direction, the distance between the first coordinate point and the second coordinate point along the target brightness direction, and the brightness value of the coordinate point. Further, the brightness enhancement multiplier for each pixel may be determined based on the determined brightness enhancement multipliers for the coordinate points. For pixel with a farther distance to the first coordinate point, the brightness value thereof may be relatively small as compared to that of pixel with a closer distance to the first coordinate point. With the method of determining brightness enhancement multiplier for each pixel in the image, pixel with a farther distance to the first coordinate point may correspond to a larger brightness enhancement multiplier. The fill light module 370 may determine the target brightness enhancement multiplier for each pixel in the image based on the determined brightness enhancement multiplier for that pixel in the image and the identification information. The fill light module 370 may fill light for each pixel in the image with the corresponding target brightness enhancement multiplier. Thus, brightness of the image may be adjusted, and details in darker regions of the image may be adjusted to be clearer.

Embodiment 1

Figure 4:
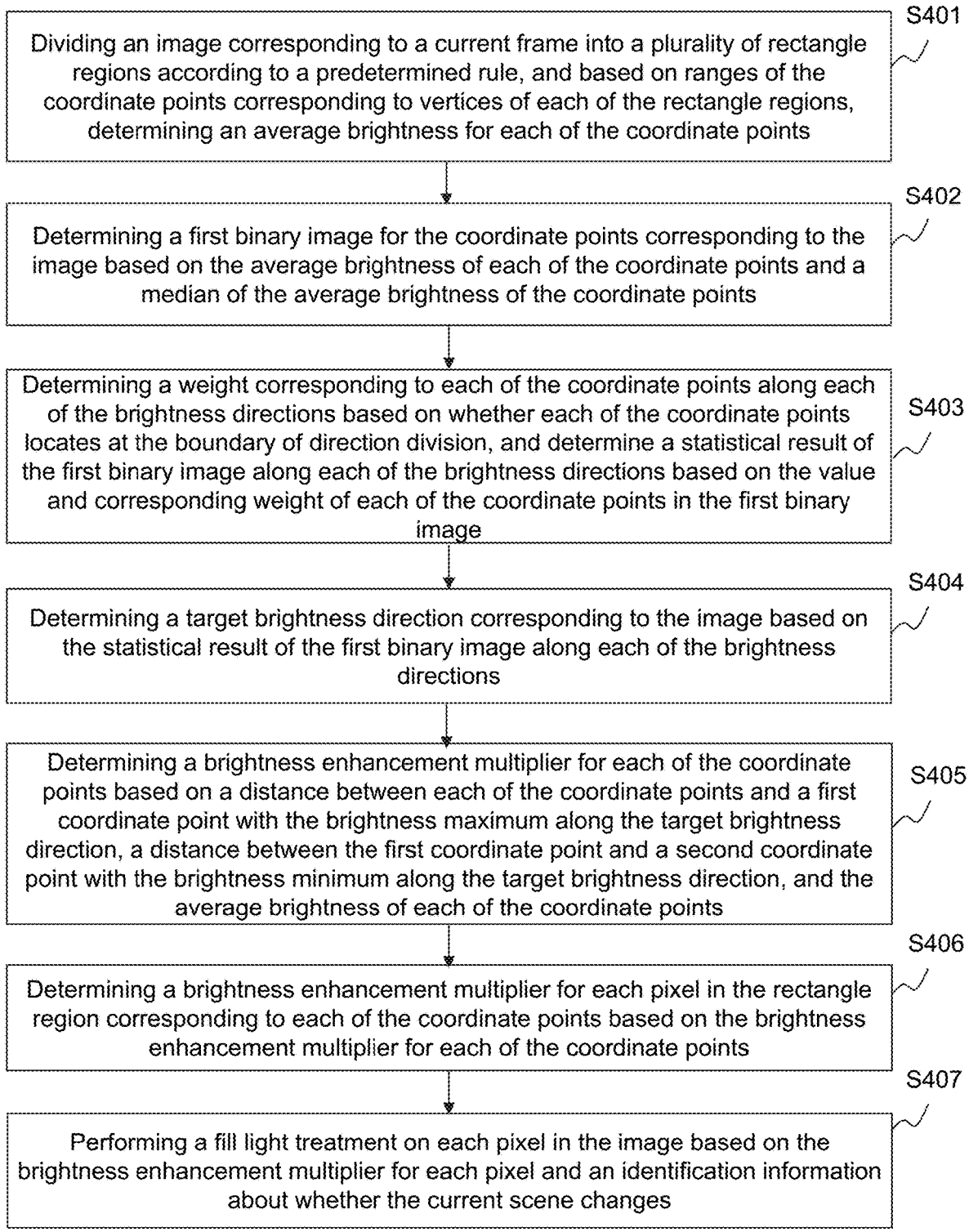
FIG. 4 is a flowchart of an exemplary process and/or method for filling light for an image according to some embodiments of the present disclosure.

FIG. 4 is a flowchart of an exemplary process and/or method for filling light for an image according to some embodiments of the present disclosure.

In S401, an image corresponding to a current frame may be divided, according to a predetermined rule, into a plurality of rectangular regions. Operation S401 may be performed by the first determination module 310. Each of the plurality of rectangular regions may inlcude a plurality of vertices which correspond to a plurality of coordinate points. The first determination module 310 may determine an average brightness value of each of the coordinate points based on ranges of the coordinate points.

In some embodiments, the process for filling light for a video image provided in the present disclosure may be implemented on an electronic device including a PC, a smart television, a camera, a mobile phone, or the like, or any combination thereof. The electronic device may divide the image corresponding to the current frame into a plurality of rectangular regions according to the predetermined rule. The electronic device may take vertices of the plurality of rectangular regions as the corresponding coordinate points. For each of the coordinate points, the electronic device may determine an average of the brightness values of all pixels within a range corresponding to the coordinate point, and determine the average as the average brightness value of the coordinate point.

The first determination module 310 may divide the image into a plurality of rectangular regions. Merely by way of example, the length of the image may be divided by n, and the width of the image may be divided by m. Thus, the image may be divided into m by n rectangular regions. Herein, m and n may refer to an integer larger than 1. m and the n may be the same or different. Vertices of the plurality of rectangular regions may be determined as corresponding coordinate points. For each of the coordinate points, a mean value of the brightness values of pixels within the range of the coordinate point may be determined as the average brightness value of the coordinate point (or referred to as the reference brightness value). For example, the range of a coordinate point may be determined as a sum of the regions corresponding to four pixels which locate on the upside, the downside, the left side and right side of the coordinate point. As another example, the range of the coordinate point may be determined as a sum of the regions corresponding to pixels in various directions of the coordinate point. The method for determining a range of a coordinate point may be various. In some embodiments, for each of the coordinate points, the same method for determining the range may be provided.

Figure 5:
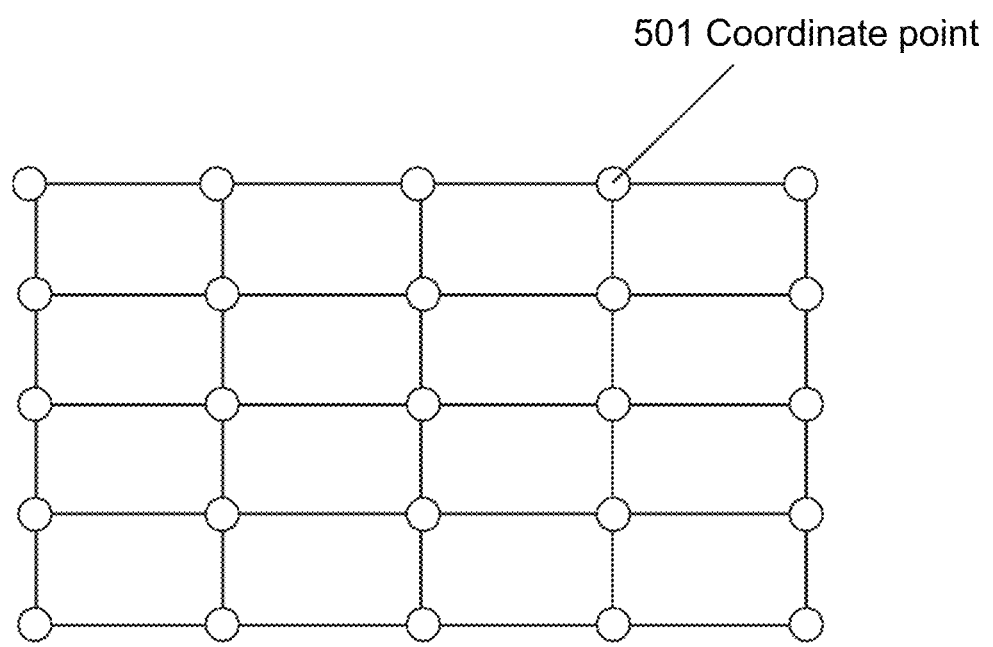
FIG. 5 is a schematic diagram illustrating an exemplary image which has been divided into regions according to some embodiments of the present disclosure.

In some embodiments, to determine the average brightness value of the coordinate point, the length and the width of the image may be divided by n. The image may be divided into $n^2$ identical rectangular regions. The $n^2$ identical rectangular regions may include $(n+1)^2$ vertices, which may be determined as the corresponding coordinate points. As shown in FIG. 5, the length and the width of the image may be divided by four, respectively. The image may be divided into 16 rectangular regions. Corresponding 25 vertices of the rectangular regions may be determined as corresponding coordinate points 501. For each of the coordinate points, the average brightness value of the coordinate point may be determined as the mean value of the sum of brightness values of pixels surrounding the coordinate point.

In S402, a median of average brightness of the coordinate points may be determined, and a first binary image of the coordinate points may be determined based on the average brightness values of the coordinate points and the determined median of average brigheneses of the coordinate points. Operation S402 may be performed by the second determination module 320.

After the average brightness values of the coordinate points are determined, the average brightness values of the coordinate points may be ranked to determine the median value of average brightness values of the coordinate points. The first binary image of the coordinate points may further be determined by comparing the average brightness values of the coordinate points with the determined median value respectively.

Merely by way of example, when the average brightness of a coordinate point is no less than the median value, the coordinate point may be corresponding to 1 in the first binary image. When the average brightness of a coordinate point is less than the median value, the coordinate point may correspond to 0 in the first binary image.

In S403, for each of a plurality of brightness directions, for each of the coordiante points, a corresponding weight may be determined based on whether the coordinate point locates at the boundary corresponding to the direction. For each of the plurality of brightness directions, a statistical result of the first binary image may be determined based on the brightness value and corresponding weight of each of the coordinate points in the first binary image. Operation S403 may be performed by the statistical determination module 330.

A brightness direction (of an image) may include top-down direction, left-right direction, or an inclined direction, or the like, or any combination thereof. For different brightness directions, there may be different boundaries.

For each coordinate point, a weight of the coordinate point may be determined based on whether the coordinate point locates at the boundary corresponding to the direction. For each brightness direction, a statistical result of the first binary image may be determined based on the first binary image corresponding to the brightness direction, and the weights of the coordinate points. For example, for each brightness direction, the statistical result of the first binary image may be determined as the sum or product of the weights of coordinate points in the first binary image.

In S404, a target brightness direction corresponding to the image may be determined based on the statistical results of the first binary image corresponding to the brightness directions. Operation S404 may be performed by the third determination module 340.

Different statistical results of first binary image may be obtained for different brightness directions. In some embodiments, statistical results of first binary image of the brightness directions may be ranked, and the largest among the statistical results of first binary image may be determined. The brightness direction corresponding to the largest statistical result of first binary image may be determined as the target brightness direction.

In S405, the fourth determination module 35 may determine, for each coordinate point, the brightness enhancement multiplier for the coordinate point may be determined based on the distance between the coordinate point and the first coordinate point along the target brightness direction, the distance between the first coordinate point and the second coordinate point along the target brightness direction, and the brightness value of the coordinate point. As used herein, the first coordinate point may refer to the coordinate point with a maximum brightness value among the coordinate points. The second coordinate point may refer to the coordinate point with a minimum brightness value among the coordinate points.

The brightness enhancement multiplier for a certain coordinate point may be determined by equation (1) as illustrated below.

$$Y_{dlc\_out} = Y_{dlc\_in}\left(1 + \frac{W}{W_{max}} \times T\right), \quad (1)$$

wherein $Y_{dlc\_out}$ may represent a fill light output value. $Y_{dlc\_in}$ may represent brightness value of the coordinate point. W may represent a distance between the coordinate point and the first coordinate point along the target brightness direction. may represent a distance between the first coordinate point and the second coordinate point along the target brightness direction.

In S406, for each coordinate point, the fifth determination module 360 may determine a brightness enhancement multiplier for each pixel in a rectangular region corresponding to the coordinate point, based on the brightness enhancement multiplier for the coordinate point.

The rectangular region may correspond to four coordinate points including the coordinate point. The fifth determination module 360 may determine the brightness enhancement multiplier for each of the pixels in the rectangular region based on the brightness enhancement multipliers for the four coordinate points. Merely by way of example, for each of the pixels in the rectangular region, the fifth determination module 360 may determine distances from the pixel to the four coordinate points of the rectangular region respectively, to obtain weights of the four distances. The fifth determination module 360 may determine the brightness enhancement multiplier for the pixel as a sum of the product of the weight of each distance and the brightness enhancement multiplier corresponding to that distance. As another example, the fifth determination module 360 may determine an average of the brightness enhancement multipliers of the four coordinate points corresponding to the rectangular region as the brightness enhancement multiplier for each pixel in the rectangular region.

In some embodiments, the fifth determination module 360 may determine the brightness enhancement multiplier for each pixel in the image with a bilinear interpolation method. Specifically, the fifth determination module 360 may determine a brightness enhancement multiplier for a pixel within the rectangular region based on brightness enhancement multipliers for the four coordinate points corresponding to the rectangular region (e.g., the four vertices of the rectangular region) by employing a bilinear interpolation method. Further, the fifth determination module 360 may determine brightness enhancement multiplier for each pixel in the image based on brightness enhancement multipliers for the coordinate points in the image (e.g., all the coordinate points in the image). The method of determining the brightness enhancement multiplier for each pixel in the image based on the brightness enhancement multipliers for the coordinate points in the image may not be repeated here.

In S407, the fill light module 370 may fill light for each pixel in the image based on the brightness enhancement multiplier for that pixel and identification information indicating whether the current scene is changed.

The fill light module 370 may determine a target brightness enhancement multiplier for each pixel in the image based on the determined brightness enhancement multiplier for that pixel in the image and the identification information. The fill light module 370 may fill light for each pixel in the image with the corresponding target brightness enhancement multiplier.

In some embodiments, for each coordinate point, the brightness enhancement multiplier for the coordinate point may be determined based on the distance between the coordinate point and the first coordinate point along the target brightness direction, the distance between the first coordinate point and the second coordinate point along the target brightness direction, and the brightness value of the coordinate point. Further, the brightness enhancement multiplier for each pixel may be determined based on the determined brightness enhancement multipliers for the coordinate points. For pixel with a farther distance to the first coordinate point, the brightness value thereof may be relatively small as compared to that of pixel with a closer distance to the first coordinate point. With the method of determining brightness enhancement multiplier for each pixel in the image, pixel with a farther distance to the first coordinate point may correspond to a larger brightness enhancement multiplier. The fill light module 370 may determine the target brightness enhancement multiplier for each pixel in the image based on the determined brightness enhancement multiplier for that pixel in the image and the identification information. The fill light module 370 may fill light for each pixel in the image with the corresponding target brightness enhancement multiplier. Thus, brightness of the image may be adjusted, and details in darker regions of the image may be adjusted to be clearer.

Embodiment 2

The Embodiment 2 is constructed based on the Embodiment 1. According to the Embodiment 2, to determine the weight of each of the coordinate points and determine the statistical results of the first binary image corresponding to each of the brightness directions, the statistical determination module 330 may determine a coordinate point to be corresponding to a first weight or a second weight based on whether the coordinate point locates at the boundary corresponding to the brightness direction. Thus, the determining a weight of each of the coordinate points based on whether the coordinate point locates at the boundary corresponding to the direction may include one or more of the following operations.

For each of the brightness directions, the statistical determination module 330 may determine a boundary corresponding to the brightness direction in the first binary image.

For each of the brightness directions, upon determining that a coordinate point in the first binary image locates at the boundary, the statistical determination module 330 may determine the coordinate point to correspond to a first weight. Upon determining that the coordinate point in the first binary image does not locate at the boundary, the statistical determination module 330 may determine the coordinate point to correspond to a second weight. The second weight may be different from the first weight.

Figure 6A:
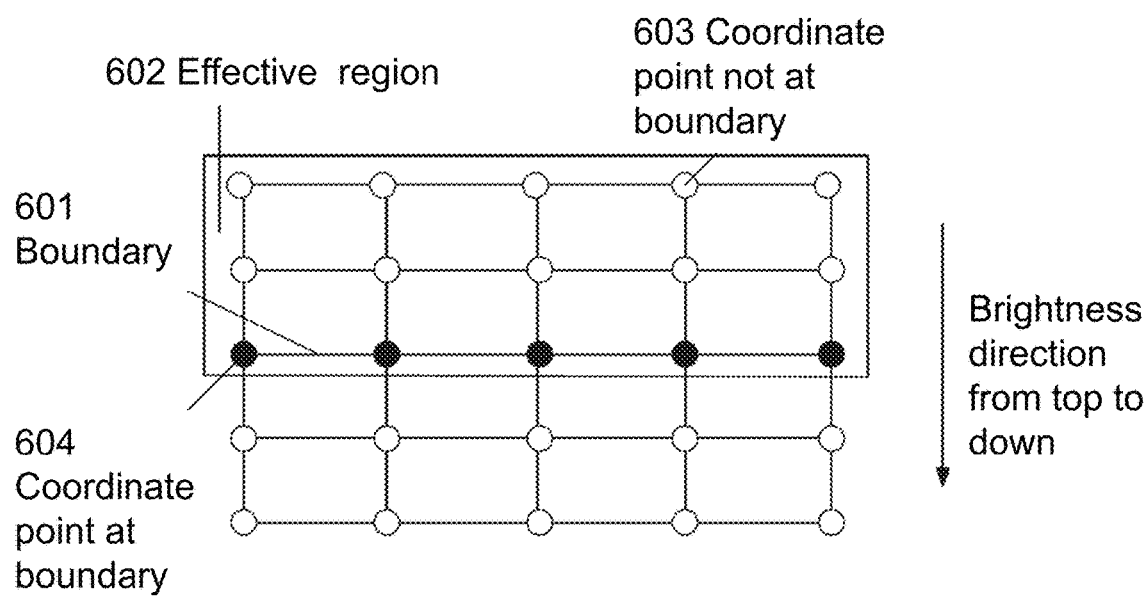
FIGS. 6A and 6B illustrate a schematic diagram illustrating an exemplary image according to some embodiments of the present disclosure.
Figure 6B:
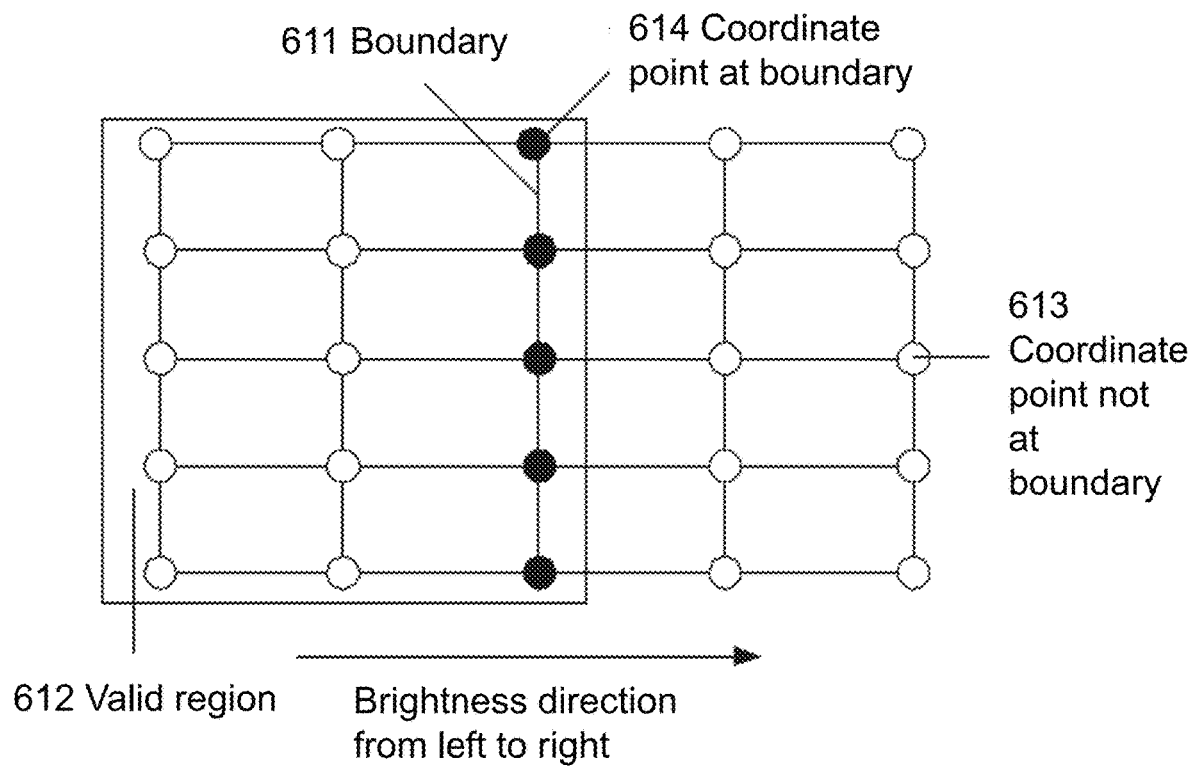

An image (e.g., the first binary image) may include different boundaries corresponding to different brightness directions. For a certain brightness direction, the boundary corresponding to the brightness direction may refer to a location that is perpendicular to the brightness direction, and passes through the center point of the image. For example, as shown in FIG. 6A, 25 coordinate points may be determined by dividing, the length and the width of the image into four parts respectively. For a top-down brightness direction, the five coordinate points in the third row counted from the top may be determined to locate at the boundary. For a left-right brightness direction, as shown in FIG. 6B, the five coordinate points in the third column counted from left may be determined to locate at the boundary.

For the certain brightness direction, when a coordinate in the first binary image point locates at the boundary, the coordinate point may correspond to a first weight $W_{boundary}$. The first weight $W_{boundary}$ may be a predetermined empirical parameter of boundary weight. When a coordinate point in the first binary image does not locate at the boundary, the coordinate point may correspond to a second weight $W_{nboundary}$. The second weight $W_{nboundary}$ may be a predetermined empirical parameter of non-boundary weight. Herein, the first weight $W_{boundary}$ and the second weight $W_{nboundary}$ may be different.

After determining weights corresponding to the coordinate points in the first binary image, statistical result of the first binary image may be determined. For a certain brightness direction, the statistical result of the first binary image may be determined based on the brightness value and weight of each of the coordinate points in the first binary image. The method of determining the statistical result of the first binary image may include one or more of the following operations.

For a certain brightness direction, an effective region in the first binary image may be determined. The effective region may refer to a region with a relatively high brightness at the boundary. The products of the weight of each coordinate point and the value of that coordinate point in the first binary image may be summed up to determine a statistical result of the first binary image.

For each brightness direction, the statistical determination module 330 may determine a boundary in the image (e.g., the first binary image), which may divide the image into two regions. The statistical determination module 330 may designate the region with relatively high brightness of the two regions as an effective region. For example, as shown in FIG. 6A, the effective region may be the region above the boundary. As shown in FIG. 6B, the effective region may be the region at the left of the boundary. In some embodiments, the statistical determination module 330 may determine the statistical result of the first binary image based on the effective region. For example, for each of the brightness directions, the statistical determination module 330 may determine the statistical result of the first binary image as the sum of the products of the weight of each coordinate point and the value of that coordinate point in the first binary image.

Embodiment 3

The Embodiment 3 may be constructed based on the Embodiment 1. According to the Embodiment 3, to determine the target brightness direction of the image, the statistical result of the first binary image may be compared with a predetermined first brightness threshold, and the determining a target brightness direction corresponding to the image based on the statistical results of the first binary image corresponding to the brightness directions may include one or more of the following operations.

For a first brightness direction, whether the statistical result of the first binary image corresponding to the first brightness direction is greater than the predetermined first brightness threshold may be determined. Upon determining that the statistical result of the first binary image corresponding to the first brightness direction is larger than the predetermined first brightness threshold. Whether statistical result of the first binary image corresponding to the first brightness direction is the maximum one among the statistical results of first binary images corresponding to the brightness directions may be determined. The first brightness direction may be determined as the target brightness direction, upon determining that the statistical result of the first binary image corresponding to the first brightness direction is the maximum one among the statistical results of first binary images corresponding to the brightness directions.

The predetermined first brightness threshold $T_{centerlight}$ may be pre-stored in an electronic device. Different statistical results of binary image may be obtained according to different brightness directions. For the first brightness direction, whether the statistical result of the first binary image corresponding to the first brightness direction is greater than the pre-stored first brightness threshold $T_{centerlight}$ may be determined. Upon determining that the statistical result of the first binary image corresponding to the first brightness direction is greater than the pre-stored first brightness threshold $T_{centerlight}$, the statistical result of the first binary image corresponding to the first brightness direction may be compared with statistical results of corresponding first binary images of the other brightness directions. The first brightness direction may be determined as the target brightness direction of the image, upon determining that the statistical result of the first binary image corresponding to the first brightness direction is the maximum among the statistical results of corresponding first binary images of all other brightness directions.

Embodiment 4

The Embodiment 4 may be constructed based on the Embodiment 1 and the Embodiment 3. According to the Embodiment 4, the method may further perform one or more of the following operations before determining the target brightness direction of the image.

A second binary image of the coordinate points may be determined based on a pre-stored target average brightness value.

For each of the brightness directions, a weight of each of the coordinate points may be determined based on whether the coordinate point locates at the boundary corresponding to the brightness direction. A statistical result of the second binary image may be determined based on the brightness value and corresponding weight of each of the coordinate points in the second binary image.

The determining the target brightness direction corresponding to the image based on the statistical results of first binary image of the brightness directions may include one or more of the following operations.

For the first brightness direction, whether the statistical result of the first binary image is greater than the predetermined first brightness threshold, and a statistical result of the second binary image is greater than a predetermined second brightness threshold, may be determined.

Upon the determination that the statistical result of the first binary image is greater than the predetermined first brightness threshold, and the statistical result of the second binary image is greater than a predetermined second brightness threshold, whether the statistical result of the first binary image corresponding to the first brightness direction is the maximum one among the statistical results of first binary images corresponding to the brightness directions, and the statistical result of the second binary image corresponding to the first brightness direction is the maximum one among the statistical results of second binary images corresponding to the brightness directions, may be determined. Upon the determination that the statistical result of the first binary image corresponding to the first brightness direction is the maximum one among the statistical results of first binary images corresponding to the brightness directions, and the statistical result of the second binary image corresponding to the first brightness direction is the maximum one among the statistical results of second binary images corresponding to the brightness directions, the first brightness direction may be determined as the target brightness direction.

A target average brightness value $T_{lightvalue}$ may be pre-stored in the electronic device. The target average brightness value $T_{lightvalue}$ may refer to a mean value of the average brightness values of all of the coordinate points in successive image frames. A second binary image of the coordinate points may be determined by comparing each of the average brightness values of the coordinate points with the target average brightness value $T_{lightvalue}$ respectively. For example, upon determining that the average brightness of a coordinate point of the coordinate points is no less than the pre-stored target average brightness $T_{lightvalue}$, the coordinate point may correspond to one in the second binary image. Upon determining that the average brightness of the coordinate point is less than the pre-stored average brightness $T_{lightvalue}$, the coordinate point may correspond to zero in the second binary image.

Different brightness directions of the image may correspond to different boundaries. For a certain brightness direction, a boundary corresponding to the brightness direction may be determined. In the second binary image, the coordinate point locates at the boundary of direction division may correspond to a first weight. The coordinate point does not locate at the boundary may correspond to a second weight. The first weight and the second weight may be different. The image may be divided into two regions by the boundary. A region with relatively high brightness in the two regions may be determined as an effective region. The statistical result of the second binary image may be determined by summing up of the products of the weight of each coordinate point in the effective region and the value of that coordinate point in the second binary image. For each of the brightness directions, a corresponding statistical result of the second binary image may be determined.

To determine the target brightness direction of the video image, a first brightness threshold $T_{centerlight}$ may be pre-stored in the first binary image, and a second brightness threshold $T_{centerlight}$ may be pre-store in the second binary image. Upon determining that the statistical result of the first binary image corresponding to the first brightness direction is greater than the pre-stored first brightness threshold $T_{centerlight}$, the statistical result of the first binary image corresponding to first brightness direction is the maximum among statistical results of the first binary image corresponding to the brightness directions, the statistical result of the second binary image corresponding to the first brightness direction is greater than the pre-stored second brightness threshold $T_{lightvalue}$, the statistical result of the second binary image corresponding to the first brightness direction may be compared to the statistical results of the second binary image corresponding to other brightness directions. Upon determining that the statistical result of the second binary image corresponding to the first brightness direction is the maximum one among the statistical results of the second binary image corresponding to the brightness directions, the first brightness direction may be determined as the target brightness direction of the video image.

The Embodiment 5 may be constructed based on the Embodiment 1. According to the Embodiment 5, to determine the brightness enhancement multiplier for each of the coordinate points, at least one fill light result (e.g., two fill light results) may be designated. The determining a brightness enhancement multiplier for each of the coordinate points based on a distance between each of the coordinate points and a first coordinate point along the target brightness direction, a distance between the first coordinate point and a second coordinate point along the target brightness direction, and the average brightness value of each of the coordinate points may comprise one or more of the following operations.

For each coordinate point, a first brightness enhancement multiplier for the coordinate point and a second brightness enhancement multiplier for the coordinate point may be determined. The first brightness enhancement multiplier and/or the second brightness enhancement multiplier for the coordinate point may be determined based on the fill light result, the fill light input value, the distance between the coordinate point and the first coordinate point in the target brightness direction, and the distance between the first coordinate point and the second coordinate point along the target brightness direction. For the determination of the first brightness enhancement multiplier, a product of the average brightness of the coordinate point and a predetermined brightness enhancement multiplier may be determined as a fill light result, and the average brightness of the coordinate point may be determined as a fill light input value. For the determination of the second brightness enhancement multiplier, the average brightness of the first coordinate point may be determined as the fill light result, and the average brightness of the coordinate point may be determined as the fill light input value.

For each coordinate point, a ratio between the first brightness enhancement multiplier and the second brightness enhancement multiplier may be determined.

A maximal ratio may be determined from the ratios. Whether the maximal ratio is greater than a predetermined ratio threshold may be determined. Upon determining that the maximal ratio is greater than the predetermined ratio threshold, the brightness enhancement multiplier for each of the coordinate points may be its corresponding ratio between the first brightness enhancement multiplier and the maximal ratio. Upon determining that the maximal ratio is no greater than the predetermined ratio threshold, the brightness enhancement multiplier for each of the coordinate points may be the first brightness enhancement multiplier thereof.

The brightness enhancement multiplier for each of coordinate points may be determined by equation (1) which may be illustrated elsewhere in the present disclosure. The fill light result may be designated as a fill light output value $Y_{dlc\_out}$. The brightness enhancement multiplier for each of coordinate points may be determined based on the fill light output value $Y_{dlc\_out}$, the brightness value $Y_{dlc\_in}$ of each of the coordinate points, the distances W between the coordinate point and the first coordinate point along the target brightness direction, and the distance $W_{max}$ between the first coordinate point and the second coordinate point along the target brightness direction.

The fill light result of each coordinate point may relate to a predetermined brightness enhancement multiplier of the coordinate point or the brightness value of the first coordinate point. For example, for each coordinate point, the product of the average brightness value of the coordinate point and a predetermined factor $T_{strength\_auto\_thr}$ may be determined as the fill light result. The predetermined factor $T_{strength\_auto\_thr}$ may be a ratio between the average value of the average brightness values of coordinate points with average brightness no less than the predetermined brightness threshold and the average value of the average brightness values of the coordinate points in the image. The fill light result may be determined as the fill light output value $Y_{dlc\_out}$. The brightness value of the coordinate point may be determined as the fill light input value $Y_{dlc\_in}$. The first brightness enhancement multiplier for the coordinate point may be determined based on the fill light output value $Y_{dlc\_out}$, the fill light input value $Y_{dlc\_in}$, the distance between the coordinate point and the first coordinate point along the target brightness direction, and the distance $T_{strength\_auto}$ between the first coordinate point and the second coordinate point along the target brightness direction.

As another example, for each coordinate point, the average brightness value of the first coordinate point $T_{maxlight}$ may be determined as the fill light result $Y_{dlc\_out}$. The average brightness value of the coordinate point may be determined as the fill light input value $Y_{dlc\_in}$. The second brightness enhancement multiplier $T_{strength\_auto\_x}$ corresponding to the coordinate point may be determined based on the fill light result $Y_{dlc\_out}$, the fill light input value $Y_{dlc\_in}$, the distance between the coordinate point and the first coordinate point along the target brightness direction, and the distance between the first coordinate point and the second coordinate point along the target brightness direction.

A predetermined ratio threshold $T_{strength}$ may be prestored in the electronic device. After determining the first brightness enhancement multiplier $T_{strength\_auto}$ and the second brightness enhancement multiplier $T_{strength\_auto\_x}$ corresponding to the coordinate point, a ratio between the first brightness enhancement multiplier $T_{strength\_auto}$ and the second brightness enhancement multiplier $T_{strength\_auto\_x}$ for the coordinate point may be determined. A maximal ratio $R_{strength\_max}$ may be determined by ranking the ratios. Further, whether the maximal ratio $R_{strength\_max}$ is greater than the predetermined ratio threshold $T_{strength}$ may also be determined. Upon determining that the maximal value $R_{strength\_max}$ is greater than the predetermined ratio threshold $T_{strength}$, the brightness enhancement multiplier for the coordinate point may be the quotient of the corresponding first brightness enhancement multiplier $T_{strength\_auto}$ and the maximal ratio $R_{strength\_max}$. Upon determining that the maximal value $R_{strength\_max}$ is no greater than the predetermined ratio threshold $T_{strength}$, the brightness enhancement multiplier for the coordinate points may be the first brightness enhancement multiplier $T_{strength\_auto}$ thereof.

Embodiment 6

The Embodiment 6 may be constructed based on the Embodiment 1. To determine a target brightness enhancement multiplier for each pixel and fill light for the image, the fill light module 370 may filling light for each pixel in the image based on the brightness enhancement multiplier for that pixel and identification information indicating whether the current scene is changed may include one or more of the following operations.

When the identification information of the scene change indicates that a scene change has occurred, the fill light treatment may be performed on each pixel in an image corresponding to a current frame based on the brightness enhancement multiplier for each pixel in an image corresponding to a last frame.

When the identification information of the scene change indicates that the scene has not changed, whether the brightness direction of the image (e.g., the current frame) is the same as the brightness direction of a historical frame may be determined. Upon determining that the brightness direction of the image is the same as the brightness direction of the historical frame, for each pixel, a ratio between a difference between the brightness enhancement multiplier for the pixel in the image corresponding to the current frame and the brightness enhancement multiplier for the pixel in the image corresponding to the last frame, and the predetermined stepping threshold may be determined. A target brightness enhancement multiplier corresponding to the pixel may be determined based on the ratio and the brightness enhancement multiplier for the pixel in the image corresponding to the last frame. The fill light treatment on the pixel in the image corresponding to the current frame may be performed based on the target brightness enhancement multiplier. Upon determining that the brightness direction of the image is different from the brightness direction of the stored historical frame, the target brightness enhancement multiplier corresponding to the pixel may be determined based on a fixed ratio threshold which is less than one, and the brightness enhancement multiplier for the pixel in the image corresponding to the last frame. The fill light treatment may be performed on the pixel in the image corresponding to the current frame based on the target brightness enhancement multiplier.

In some embodiments, identification information of the scene change indicating that the scene change has occurred may correspond to a scene change indicator 1. Identification information of the scene change indicating that the scene change has not occurred may correspond to a scene change indicator 0. In response to an indicator 1, the brightness enhancement multiplier for each pixel in the last frame (or referred to as the image corresponding to the last frame) may be used as brightness enhancement multiplier for each pixel in the current frame. The fill light treatment for each pixel in the current frame may be performed based on the brightness enhancement multiplier for each pixel in the current frame.

The electronic device may pre-store the brightness direction of a historical frame, a predetermined stepping threshold $T_{center\_step}$, and a ratio threshold. In response to a scene change indicator 0, whether the target brightness direction of the current frame is the same as the brightness direction of the stored historical frame may be determined. Upon determining that the target brightness direction of the image is the same as the brightness direction of the stored historical frame, for each pixel, a ratio between a difference between the brightness enhancement multiplier for the pixel in the current frame and the brightness enhancement multiplier for the pixel in the last frame, and the predetermined stepping threshold $T_{center\_step}$ may be determined, and the target brightness enhancement multiplier for the pixel may be determined based on a sum of the ratio and the brightness enhancement multiplier for the pixel in the last frame. The fill light treatment may be performed on the pixel in the current frame based on the determined target brightness enhancement multiplier. Merely by way of example, the fill light treatment may be performed by multiplying the pixel in the current frame by the determined target brightness enhancement multiplier.

In respond to the determination that the target brightness direction of the image is different from the brightness direction of the stored historical frame, for each pixel, the target brightness enhancement multiplier for the pixel in the current frame may be determined based on a product of the fixed ratio threshold that is less than one and the brightness enhancement multiplier for the pixel in the last frame. The fill light treatment may be performed on the pixel in the current frame based on the determined target brightness enhancement multiplier. Merely by way of example, the fill light treatment may be performed by multiplying the pixel in the current frame by the determined target brightness enhancement multiplier.

In some embodiments, when the scene change indicator 1, which may indicate that a scene change has occurred, the method may further include one or more of the following operations.

Whether the brightness direction of the current frame is the same as the brightness direction of the last frame may be determined. A first direction change value $T_{direction\_change\_num}$, which may be pre-stored in an electronic device as illustrated elsewhere in the present disclosure, may be updated based on the determination result. Upon determining that the brightness direction of the current frame is different from the brightness direction of the last frame, the first direction change value $T_{direction\_chnage\_num}$ may be added by 1. Upon determining that the brightness direction of the current frame is the same as the brightness direction of the last frame, the first direction change value $T_{direction\_change\_num}$ may be set to 0.

Whether the updated first direction change value $T_{direction\_change\_num}$ is no less than a predetermined first direction change threshold $T_{direction\_change\_thr}$ may be determined. Upon determining that the updated first direction change value $T_{direction\_change\_num}$ is no less than the predetermined first direction change threshold $T_{direction\_change\_thr}$, the scene change indicator may be set to zero, indicating that a scene change has not occurred.

The electronic device may pre-store the first direction change value $T_{direction\_change\_num}$ and the first direction change threshold $T_{direction\_change\_thr}$. During the fill light treatment, when the scene change indicator is 1, whether the brightness direction of the current frame is the same as the brightness direction of the last frame may be determined. The stored first direction change value $T_{direction\_change\_num}$ may be updated based on the determination result. Upon determining that the brightness direction of the current frame is different from the brightness direction of the last frame, the first direction change value $T_{direction\_change\_num}$ may be added by 1. Upon determining that the brightness direction of the current frame is the same as the brightness direction of the last frame, the first direction change value $T_{direction\_change\_num}$ may be set to 0. In some embodiments, whether the updated first direction change value $T_{direction\_change\_num}$ is no less than the predetermined first direction change threshold $T_{direction\_change\_thr}$ may also be determined. Upon determining that the updated first direction change value $T_{direction\_change\_num}$ is no less than the predetermined first direction change threshold $T_{direction\_change\_thr}$, the scene change indicator may be set to 0, indicating that a scene change has not occurred.

In some embodiments, when the scene change indicator is 0, which may indicate that a scene change has not occurred, the method may further include one or more of the following operations.

Whether the brightness direction of the current frame is the same as the brightness direction of the last frame may be determined, and the determination result may be used to update a second direction change value $T_{direction\_thr\_num}$ Which may be pre-stored, for exampel, in the electronic device. Upon determining that the brightness direction of the current frame is different from the brightness direction of the last frame, the second direction change value $T_{direction\_thr\_num}$ may be added by 1. Upon determining that the brightness direction of the current frame is the same as the brightness direction of the last frame, the second direction change value $T_{direction\_thr\_num}$ may be subtracted by 1.

Whether the updated second direction change value $T_{direction\_thr\_num}$ is no less than a predetermined second direction change threshold $T_{direction\_adj\_thr}$ which may be pre-stored in the electronic device as illustrated elsewhere in the present disclosure, may be determined. Upon determining that the updated second direction change value $T_{direction\_thr\_num}$ is no less than the predetermined second direction change threshold $T_{direction\_adj\_thr}$ the scene change indicator may be set to 1, indicating that a scene change has occurred.

The electronic device may pre-store the second direction change value $T_{direction\_thr\_num}$ and the second direction change threshold $T_{direction\_adj\_thr}$. During the fill light treatment, if the scene change indicator is 0, whether the brightness direction of the current frame is the same as the brightness direction of the last frame may be determined, and the determination result may be used to update the second direction change value. Upon determining that the brightness direction of the current frame is different from the brightness direction of the last frame, the first direction change value $T_{direction\_thr\_num}$ may be added by 1. Upon determining that the brightness direction of the current frame is the same as the brightness direction of the last frame, the second direction change value $T_{direction\_thr\_num}$ may be subtracted by 1. In some embodiments, whether the updated second direction change value $T_{direction\_thr\_num}$ is no less than the predetermined second direction change threshold $T_{direction\_adj\_thr}$ may also be determined. Upon determining that the updated second direction change value $T_{direction\_thr\_num}$ is no less than the predetermined second direction change threshold $T_{direction\_adj\_thr}$, the scene change indicator may be set to 1, indicating that a scene change has occurred.

In some embodiments, a third direction change value and a third direction change threshold may be stored in the electronic device, and the method may further include one or more of the following operations.

Whether the brightness direction of the current frame is the same as the brightness direction of a historical frame (e.g., a historical frame stored in the electronic device) may be determined, and the determination result may be used to update the third direction change value.

Upon determining that the brightness direction of the current frame is different from the brightness direction of the historical frame, the third direction change value may be added by 1. Upon determining that the brightness direction of the current frame is the same as the brightness direction of the historical frame, the third direction change value may be subtracted by 1.

Whether the updated third direction change value is no less than the predetermined third direction change threshold may be determined. Upon determining that the updated third direction change value is no less than the predetermined third direction change threshold, the brightness direction of the historical frame may be determined as the brightness direction of the image corresponding to the current frame.

The electronic device may pre-store the third direction change value and the third direction change threshold. During the fill light treatment, whether the brightness direction of the current frame is the same as the brightness direction of the historical frame may be determined, and the determination result may be used to update the third direction change value. Upon determining that the brightness direction of the current frame is different from the brightness direction of the stored historical frame, the third direction change value may be added by 1. Upon determining that the brightness direction of the current frame is the same as the brightness direction of the historical frame, the stored third direction change value may be subtracted by 1. In some embodiments, whether the updated third direction change value is no less than the predetermined third direction change threshold may also be determined. Upon determining that the updated third direction change value is no less than the predetermined third direction change threshold, the brightness direction of the historical frame may be set to be the same as the brightness direction of the image corresponding to the current frame, updating the brightness direction of the historical frame.

FIGS. 6A and 6B illustrate a schematic diagram illustrating an exemplary frame (image) according to some embodiments of the present disclosure. As illustrated in FIG. 6A, the brightness direction is from top to down, a boundary 601 may divide the frame into two regions. The region above the boundary 601 is the effective region 602. The coordinate points in the frame may include coordinate points at boundary 604 and coordinate points not at boundary 603. As illustrated in FIG. 6B, the brightness direction is from left to right, a boundary 611 may divide the frame into two regions. The region in left of the boundary 611 is the effective region 612. The coordinate points in the frame may include coordinate points at boundary 614 and coordinate points not at boundary 613.

Figure 7:
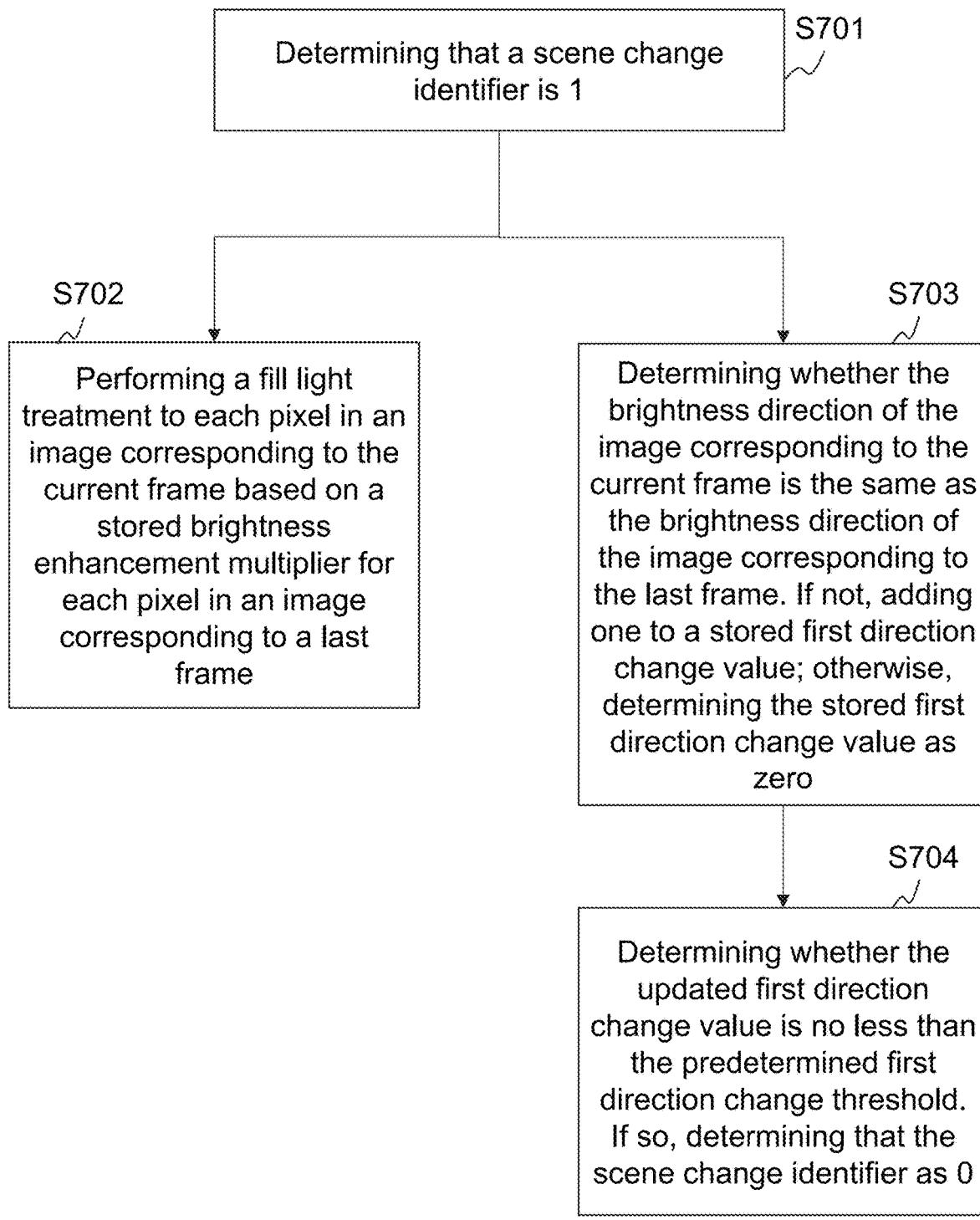
FIG. 7 illustrates an exemplary process for filling light for each pixel when the scene change indicator is 1 according to some embodiments of the present disclosure.

FIG. 7 illustrates an exemplary process for filling light for each pixel when the scene change indicator is 1 according to some embodiments of the present disclosure.

In S701, a scene change indicator 1 may be determined. In respond to the scene change indicator 1, operations S702 and S703 may be executed.

In some embodiments, the operations S702 and S703 may be performed in sequence. The sequence of the operations S702 and S703 may be variable. For exampel, the operation S702 may be executed before S730. As another example, the operation S703 may be executed before S702. In some embodiments, the operations S702 and S703 may be executed at the same time through two threads.

In S702, for each pixel, filling light for the pixel in a current frame based on a brightness enhancement multiplier for the pixel in the last frame. As used herein, the last frame may refer to an immediately prior frame of the current frame. The brightness enhancement multiplier for the pixel in the last frame may be pre-stored in an electronic device.

In S703, whether the brightness direction of the current frame is the same as the brightness direction of the last frame may be determined. A first direction change value, which may be stored in an electronic device, may be updated according to the determination result. Upon determining that the brightness direction of the current frame is different from the brightness direction of the last frame, the first direction change value may be added by 1. Upon determining that the brightness direction of the current frame is the same as the brightness direction of the last frame, the first direction change value may be set to zero, and the operation S704 may be performed.

In S704, whether the updated first direction change value is no less than a predetermined first direction change threshold may be determined. If so, the scene change indicator may be set to 0.

Figure 8:
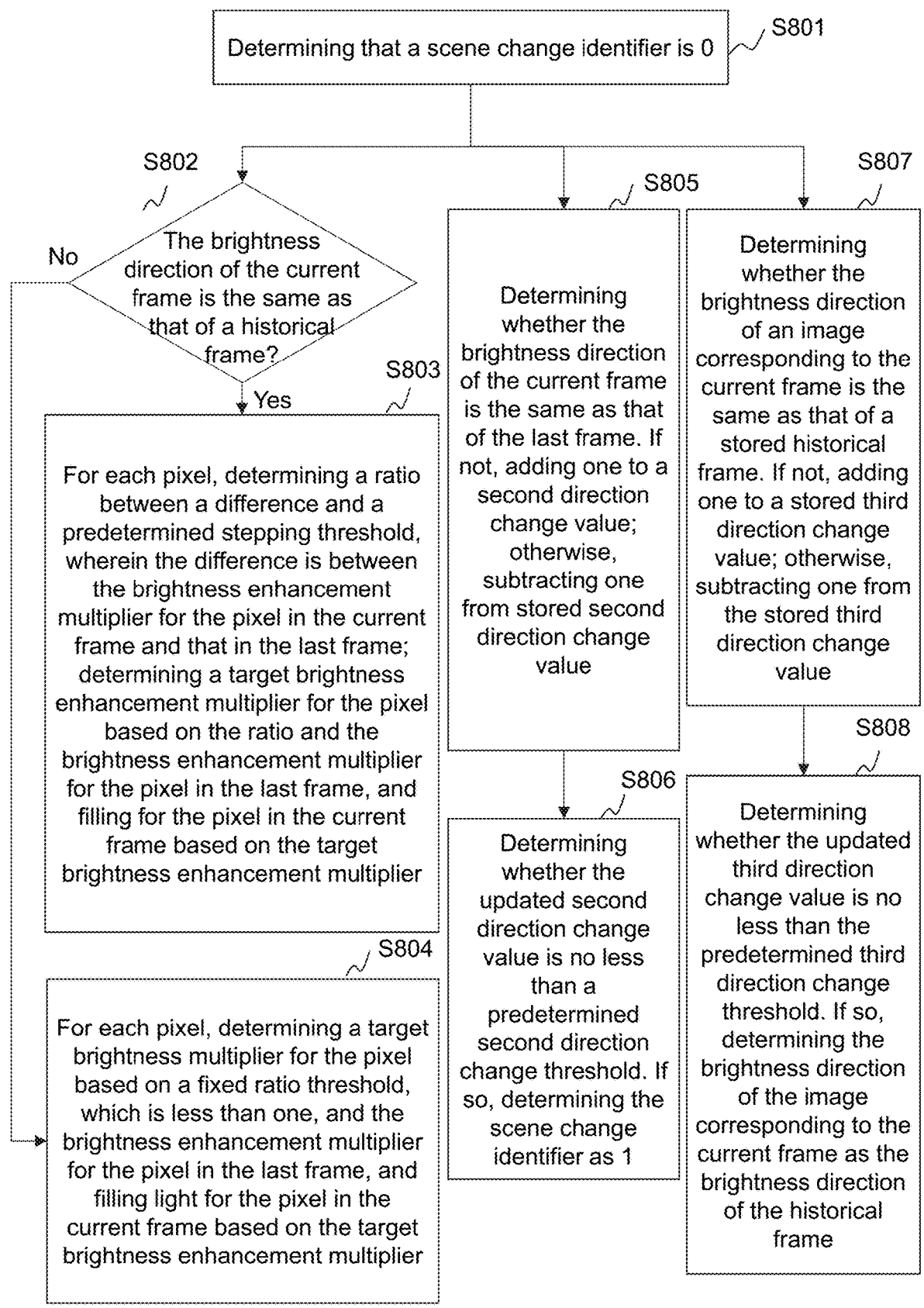
FIG. 8 is a flowchart illustrating an exemplary process for filling light for each pixel when the scene change indicator is 0, according to some embodiments of the present disclosure.

FIG. 8 is a flowchart illustrating an exemplary process for filling light for each pixel when the scene change indicator is 0, according to some embodiments of the present disclosure.

In S801, a scene change indicator 0 may be determined. In respond to the scene change indicator 0, operations S802, S805 and S807 may be executed.

In some embodiments, the operations S802, S805 and S807 may be performed in sequence. The sequence of the operations S802, S805 and S807 may be variable. For example, the operation S805 may be executed first. As another example, the operation S807 may be executed first. In some embodiments, the operations S802, S805 and S807 may be executed at the same time through different threads.

In S802, whether the brightness direction of the current frame is the same as that of a historical frame may be determined. Upon determining that the brightness direction of an image is the same as that of the historical frame, operation S803 may be executed. Upon determining that the brightness direction of the image is different from that of the historical frame, operation S804 may be executed.

In S803, for each pixel, a ratio between a difference between the brightness enhancement multiplier for the pixel in the current frame and that in the last frame and a predetermined stepping threshold may be determined. A target brightness enhancement multiplier for the pixel may be determined based on the ratio and the brightness enhancement multiplier for the pixel in the last frame. A fill light treatment may be performed on the pixel in the current frame based on the target brightness enhancement multiplier.

In S804, a target brightness enhancement multiplier for the pixel may be determined based on a fixed ratio threshold which is less than one, and the brightness enhancement multiplier for the pixel in the last frame. A fill light treatment may be performed on the pixel in the current frame based on the target brightness enhancement multiplier.

In S805, whether the brightness direction of the current frame is the same as that of the last frame may be determined. The determination result may be used to update a second direction change value which may be stored in an electronic device. Upon determining that the brightness direction of the current frame is different from that of the last frame, the second direction change value may be added by 1. Upon determining that the brightness direction of the current frame is the same as that of the last frame, the second direction change value may be subtracted by 1.

In S806, whether the updated second direction change value is no less than a predetermined second direction change threshold may be determined. If so, the scene change indicator may be set to one.

In S807, whether the brightness direction of the current frame is the same as that of a historical frame which may be stored in an electronic device, may be determined. The determination result may be used to update a third direction change value which may be stored in an electronic device. Upon determining that the brightness direction of the current frame is different from that of the historical frame, the third direction change value may be added by 1. Upon determining that the brightness direction of the current frame is the same as that of the historical frame, the third direction change value may be subtracted by 1, and operation S808 may be executed.

In S808: whether the updated third direction change value is no less than a predetermined third direction change threshold may be determined. Upon determining that the updated third direction change value is no less than the predetermined third direction change threshold, the brightness direction of the historical frame may be modified to be the same as the brightness direction of the current frame.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A system for processing images, comprising at least one video processing device, wherein during operation, the at least one video processing device is configured to:
    obtain a first image including a plurality of reference pixels, the first image being associated with at least one brightness direction;
    for each of the plurality of reference pixels, obtain a reference brightness value;
    identify a target brightness direction from the at least one brightness direction;
    for each of the plurality of reference pixels, determine a brightness enhancement multiplier for the reference pixel based on the plurality of reference brightness values and locations of the plurality of reference pixels along the target brightness direction of the first image, including:
        determining, from the plurality of reference pixels, a first reference pixel with a maximum reference brightness value, a second reference pixel with a minimum reference brightness value, and a third reference pixel with a third brightness value; and
        determining a brightness enhancement multiplier for the third reference pixel based on the maximum reference brightness value, the minimum reference brightness value, the third brightness value, a distance between the first reference pixel and the second reference pixel along the target brightness direction, and a distance between the first reference pixel and the third reference pixel along the target brightness direction; and
    generate a processed first image by modifying, by the at least one video processing device, brightness of the first image at least based on the brightness enhancement multipliers.

2. The system of claim 1, wherein to obtain the plurality of reference brightness values, the at least one video processing device is configured to:
    for each of the plurality of reference pixels,
        identify a plurality of pixels in a predetermined range corresponding to the reference pixel;
        for each of the plurality of pixels, obtain a brightness value corresponding to the pixel; and
        determine the reference brightness value of the reference pixel based on the obtained brightness values.

3. The system of claim 1, wherein to identify the target brightness direction, the at least one video processing device is configured to:
    determine the target brightness direction from the at least one brightness direction based on the plurality of reference brightness values and the locations of the plurality of reference pixels along the at least one brightness direction.

4. The system of claim 3, wherein to identify the target brightness direction, the at least one video processing device is configured to:
    for each of the plurality of reference pixels,
        determine a binary value based on the plurality of reference brightness values; and
    for each of the at least one brightness direction,
        determine a value based on the plurality of binary values and the locations of the plurality of reference pixels along the brightness direction.

5. The system of claim 4, wherein after the determining of the values, the at least one video processing device is further configured to:
    determine a maximum value from the value corresponding to each of the at least one brightness direction; and
    determine the brightness direction corresponding to the maximum value as the target brightness direction.

6. The system of claim 4, wherein for each of the at least one brightness direction, to determine the value, the at least one video processing device is configured to:
    for each of the plurality of reference pixels,
        assign a weight for the reference pixel based on the location of the reference pixel along the brightness direction; and determine the value based on the plurality of binary values and the weights of the plurality of reference pixels.

7. The system of claim 6, wherein to assign the weight for the reference pixel based on the location of the reference pixel along the brightness direction, the at least one video processing device is configured to:
determine the weight based on whether the reference pixel is located at a boundary corresponding to the target brightness direction, wherein the boundary corresponding to the target brightness direction refers to a location that is perpendicular to the target brightness direction and passes through a center point of the first image.

8. The system of claim 4, wherein to determine the binary value of each of the plurality of reference pixels, the at least one video processing device is configured to:
rank the plurality of reference brightness values to determine a median value or average value; and
for each of the plurality of reference pixels,
upon determining that the reference brightness value of the reference pixel is no less than the median value, determine the binary value to be a first value; or
upon determining that the reference brightness of the reference pixel is less than the median value, determine the binary value to be a second value different from the first value.

9. The system of claim 1, wherein the first image further includes a plurality of target pixels corresponding to the plurality of reference pixels, and the at least one video processing device is configured to:
for each of the plurality of target pixels
determine a brightness enhancement multiplier for the target pixel based on the brightness enhancement multipliers for the corresponding reference pixels; and
modify brightness of the target pixel based on the determined brightness enhancement multiplier for the target pixel.

10. The system of claim 1, the at least one video processing device is further configured to:
obtain a scene change indicator; and
update the scene change indicator at least based on the target brightness direction.

11. A method for processing images, comprising:
obtaining, by at least one video processing device, a first image including a plurality of reference pixels, the first image being associated with at least one brightness direction;
for each of the plurality of reference pixels, obtaining, by the at least one video processing device, a reference brightness value;
identifying, by the at least one video processing device, a target brightness direction from the at least one brightness direction;
for each of the plurality of reference pixels, determining a brightness enhancement multiplier for the reference pixel based on the plurality of reference brightness values and locations of the plurality of reference pixels along the target brightness direction of the first image, including:
determining, from the plurality of reference pixels, a first reference pixel with a maximum reference brightness value, a second reference pixel with a minimum reference brightness value, and a third reference pixel with a third brightness value; and
determining a brightness enhancement multiplier for the third reference pixel based on the maximum reference brightness value, the minimum reference brightness value, the third brightness value, a distance between the first reference pixel and the second reference pixel along the target brightness direction, and a distance between the first reference pixel and the third reference pixel along the target brightness direction; and
generating a processed first image by modifying, by the at least one video processing device, brightness of the first image at least based on the brightness enhancement multipliers.

12. The method of claim 11, wherein the obtaining of the plurality of reference brightness values includes:
for each of the plurality of reference pixels,
identifying a plurality of pixels in a predetermined range corresponding to the reference pixel;
for each of the plurality of pixels, obtaining a brightness value corresponding to the pixel; and
determining the reference brightness value of the reference pixel based on the obtained brightness values.

13. The method of claim 11, wherein the identifying of the target brightness direction includes:
determining the target brightness direction from the at least one brightness direction based on the plurality of reference brightness values and the locations of the plurality of reference pixels along the at least one brightness direction.

14. The method of claim 13, wherein the identifying of the target brightness direction includes:
for each of the plurality of reference pixels,
determining a binary value based on the plurality of reference brightness values; and
for each of the at least one brightness direction,
determining a value based on the plurality of binary values and the locations of the plurality of reference pixels along the brightness direction.

15. The method of claim 14, wherein for each of the at least one brightness direction, the determining of the value includes:
for each of the plurality of reference pixels,
assigning a weight for the reference pixel based on the location of the reference pixel along the brightness direction; and
determining the value based on the plurality of binary values and the weights of the plurality of reference pixels.

16. The method of claim 15, wherein assigning the weight for the reference pixel based on the location of the reference pixel along the brightness direction includes:
determining the weight based on whether the reference pixel is located at a boundary corresponding to the target brightness direction, wherein the boundary corresponding to the target brightness direction refers to a location that is perpendicular to the target brightness direction and passes through a center point of the first image.

17. The method of claim 14, wherein the determining of the binary value of each of the plurality of reference pixels includes:
ranking the plurality of reference brightness values to determine a median value or average value; and
for each of the plurality of reference pixels,
upon determining that the reference brightness value of the reference pixel is no less than the median value, determining the binary value to be a first value; or upon determining that the reference brightness of the reference pixel is less than the median value, determining the binary value to be a second value different from the first value.

18. The method of claim 11, wherein the first image further includes a plurality of target pixels corresponding to the plurality of reference pixels, and the method further includes:
for each of the plurality of target pixels
determining a brightness enhancement multiplier for the target pixel based on the brightness enhancement multipliers for the corresponding reference pixels; and
modifying brightness of the target pixel based on the determined brightness enhancement multiplier for the target pixel.

19. The method of claim 11, further including:
obtaining a scene change indicator; and
updating the scene change indicator at least based on the target brightness direction.

20. A non-transitory computer readable medium, storing instructions, the instructions when executed by a processor, causing the processor to execute operations comprising:
obtaining, by at least one video processing device, a first image including a plurality of reference pixels, the first image being associated with at least one brightness direction;
for each of the plurality of reference pixels, obtaining, by the at least one video processing device, a reference brightness value;
identifying, by the at least one video processing device, a target brightness direction from the at least one brightness direction; and
for each of the plurality of reference pixels, determining a brightness enhancement multiplier for the reference pixel based on the plurality of reference brightness values and locations of the plurality of reference pixels along the target brightness direction of the first image, including:
determining, from the plurality of reference pixels, a first reference pixel with a maximum reference brightness value, a second reference pixel with a minimum reference brightness value, and a third reference pixel with a third brightness value; and
determining a brightness enhancement multiplier for the third reference pixel based on the maximum reference brightness value, the minimum reference brightness value, the third brightness value, a distance between the first reference pixel and the second reference pixel along the target brightness direction, and a distance between the first reference pixel and the third reference pixel along the target brightness direction; and
generating a processed first image by modifying, by the at least one video processing device, brightness of the first image at least based on the brightness enhancement multipliers.

* * * * *